(12) United States Patent
Saiga et al.

(10) Patent No.: US 7,958,056 B2
(45) Date of Patent: Jun. 7, 2011

(54) CONTENT DATA CREATING DEVICE, CONTROL METHOD THEREOF, PROGRAM FOR CREATING CONTENT DATA, AND CONTENT DATA DISPLAY DEVICE

(75) Inventors: Hisashi Saiga, Nara (JP); Keisuke Iwasaki, Nara (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 199 days.

(21) Appl. No.: 11/665,720

(22) PCT Filed: Oct. 14, 2005

(86) PCT No.: PCT/JP2005/018935
§ 371 (c)(1),
(2), (4) Date: Apr. 18, 2007

(87) PCT Pub. No.: WO2006/043472
PCT Pub. Date: Apr. 27, 2006

(65) Prior Publication Data
US 2007/0294775 A1      Dec. 20, 2007

(30) Foreign Application Priority Data
Oct. 22, 2004   (JP) ................................ 2004-308031

(51) Int. Cl.
*G06F 21/00* (2006.01)
(52) U.S. Cl. ........................................................ 705/59
(58) Field of Classification Search ...................... 705/59
See application file for complete search history.

(56) References Cited

U.S. PATENT DOCUMENTS

| | | | |
|---|---|---|---|
| 6,510,502 | B1 | 1/2003 | Shimizu |
| 7,353,541 | B1 | 4/2008 | Ishibashi et al. |
| 2001/0052121 | A1 | 12/2001 | Masuda et al. |
| 2003/0028385 | A1 * | 2/2003 | Christodoulou .............. 704/278 |
| 2003/0093639 | A1 | 5/2003 | Shimizu |
| 2004/0122877 | A1 | 6/2004 | Nakayama |
| 2004/0268128 | A1 * | 12/2004 | Kitani et al. .................. 713/176 |
| 2006/0224521 | A1 * | 10/2006 | Lakamp et al. ................. 705/59 |

(Continued)

FOREIGN PATENT DOCUMENTS

CN      1322422 A      11/2001
(Continued)

OTHER PUBLICATIONS

Y. Sakamoto, "Sharing Files with Office of Different Version", Microsoft Office 97 Special Features, Japan, AI Publishing Inc., Jul. 30, 1997.

*Primary Examiner* — Pierre E Elisca
(74) *Attorney, Agent, or Firm* — Birch, Stewart, Kolasch & Birch, LLP

(57) ABSTRACT

A contents data creating device is configured by equipping a computer with a contents creating software. In this contents creating software, a license information file stores license information containing information describing the permitted range of input data or output data. A GUI manager module displays a choice of options indicating the range of input data or output data unpermitted with the license information, in the mode different from that of the choice of options indicating the range of input data or output data permitted. The GUI manager module performs a conversion using the range of the input data or the output data inputted from the outside, as a parameter.

12 Claims, 20 Drawing Sheets

U.S. PATENT DOCUMENTS

2008/0154633 A1  6/2008  Ishibashi et al.

FOREIGN PATENT DOCUMENTS

| | | |
|---|---|---|
| CN | 1503166 A | 6/2004 |
| EP | 1 079 627 A1 | 2/2001 |
| EP | 1126598 A1 | 8/2001 |
| EP | 1422968 A1 | 5/2004 |
| JP | 11-24918 A | 1/1999 |
| JP | 2000-35885 A | 2/2000 |
| JP | 2001-203683 A | 7/2001 |
| JP | 2002-007138 A | 1/2002 |
| JP | 2002-56129 A | 2/2002 |
| JP | 2004-23247 A | 1/2004 |
| JP | 2004-118324 A | 4/2004 |
| JP | 2004-266578 A | 9/2004 |
| WO | WO-02/103554 A1 | 12/2002 |

* cited by examiner

```
<!ELEMENT book (char_set+, bibliography, text)>
<!ELEMENT char_set EMPTY>
<!ATTLIST char_set name CDATA #REQUIRED>
<!ELEMENT bibliography (title|author?)>
<!ELEMENT title (#PCDATA)>
<!ELEMENT author (#PCDATA)>
<!ELEMENT text (#PCDATA|nl)*>
<!ELEMENT nl EMPTY>
```

FIG.4

```
<!ELEMENT book (char_set+, bibliography, text)>
<!ELEMENT char_set EMPTY>
<!ATTLIST  char_set name CDATA #REQUIRED>
<!ELEMENT bibliography (title|author?)>
<!ELEMENT title (#PCDATA)>
<!ELEMENT author (#PCDATA)>
<!ELEMENT text (#PCDATA|nl|image)*>
<!ELEMENT nl EMPTY>
<!ELEMENT image (caption?)>
<!ATTLIST  image type (jpeg|png) #REQUIRED>
<!ATTLIST  image filename CDATA #REQUIRED>
```

FIG.5

```
<!ELEMENT book (char_set+, bibliography, text)>
<!ELEMENT char_set EMPTY>
<!ATTLIST  char_set name CDATA #REQUIRED>
<!ELEMENT bibliography (title|author?)>
<!ELEMENT title (#PCDATA)>
<!ELEMENT author (#PCDATA)>
<!ELEMENT text (#PCDATA|nl|image|sound|bold)*>
<!ELEMENT nl EMPTY>
<!ELEMENT image (caption?)>
<!ATTLIST  image type (jpeg|png) #REQUIRED>
<!ATTLIST  image filename CDATA #REQUIRED>
<!ELEMENT sound EMPTY>
<!ATTLIST  sound filename CDATA #REQUIRED>
<!ELEMENT bold (#PCDATA)>
```

FIG.6

```
<?xml version="1.0" encoding="UTF-8" ?>
<!DOCTYPE book SYSTEM "book.dtd">
<book>
<char_set name="JIS X 0201"/>
<char_set name="JIS X 0208"/>
<bibliography>
<title>VARIOUS ANIMALS</title>
<author>INUKICHI NEKOYAMA</author>
</bibliography>
<text>
<bold>PERSIAN CAT</bold><nl/>
<image type="jpeg" filename="persian_cat.jpg">
<caption>TAKEN AT KOYA-SAN</caption>
</image>
<sound filename="meow.mp3"/>
PERSIAN CAT, WITH LONG HAIR, GIVES NOBLE IMPRESSION.
<nl/>
IN JAPAN, ALONG WITH SIAMESE CAT, PERSIAN CAT HAS BEEN
CONSIDERED AS REPRESENTATIVE OF FOREIGN CATS.<nl/>
</text>
</book>
```

CONTENT DATA CREATING DEVICE, CONTROL METHOD THEREOF, PROGRAM FOR CREATING CONTENT DATA, AND CONTENT DATA DISPLAY DEVICE

TECHNICAL FIELD

The present invention relates to creation of content data, and more particularly to a content data creation device capable of changing, based on user information, a range of data of which handling is permitted, a content data creation method, a program for creating content data, and a content data display device.

BACKGROUND ART

Unauthorized use of software is an important issue for a software developer. Therefore, as a method of preventing unauthorized use, such a scheme that software is "individualized" so that use thereof is permitted in a computer having a license and a copy of the software does not work in another computer has conventionally been proposed. Here, "individualization" means that an operation of software is prohibited or restricted in an environment where a parameter is different, by at least partially modifying the content configuring the software in accordance with such parameters as system information of hardware or user information.

Japanese Patent Laying-Open No. 11-024918 discloses, as an example of such a technique, a technique to "individualize" the software by using a MAC (Media Access Control) address. Specifically, Patent Document 1 discloses in paragraph [0025] recording of a MAC address of a target computer in software at the time of introduction of the software. Then, when the software is started, the MAC address of the computer is compared with the MAC address recorded in the software (see paragraph [0030]). If the MAC addresses do not match, start of the software is aborted (see paragraph [0031]).

According to such "individualization" of the software, once processing for software introduction is performed on certain hardware, even if a malicious user copies the software that has been introduced in the certain hardware to another hardware, the copied software does not operate on another hardware or the operation is restricted. Therefore, "individualization" of the software can serve as an effective measure against unauthorized use of the software.

Patent Document 1: Japanese Patent Laying-Open No. 11-024918

DISCLOSURE OF THE INVENTION

Problems to be Solved by the Invention

It is noted here that the scheme of "individualization" of the software above may not be suitable for all software.

Specifically, in the case of content creation software for creating output data by converting input data, control more flexible than control for allowing use of software for each user may be required.

For example, if a user of the software is an individual user, a function for content creation may not be high. Meanwhile, a user who creates commercial content, however, may require relatively high content creation function.

The present invention was made in view of such circumstances. An object of the present invention is to provide a content data creation device capable of adapting, in a flexible manner, a manner of control for use of software for each user, a control method thereof, a program for creating content data, and a content data display device.

Means for Solving the Problems

A content data creation device according to the present invention is directed to a content data creation device creating output data for use in a reproduction device by converting input data which is content described by a user, and the content data creation device includes: license information storage means for storing license information including description of a range of a type of data of which input or output is permitted; input data designation means for designating the input data to be converted; and conversion means for creating the output data by performing conversion processing on the input data designated by the input data designation means, in accordance with the license information.

In addition, preferably, the content data creation device according to the present invention further includes: permitted range designation means for designating a range of a type of data permitted for the conversion processing, within a range stored in the license information storage means; and display means for displaying a menu of choices of a range of a type of the input data or the output data, for allowing designation by the permitted range designation means; and the display means displays a menu of choices indicating a range of the type of the input data or the output data not permitted by the license information, in a manner different from the menu of choices indicating the range of the type of the input data or the output data permitted by the license information.

In addition, preferably, the content data creation device according to the present invention further includes: permitted range designation means for designating a range of a type of data permitted for the conversion processing, within a range stored in the license information storage means; and display means for displaying a menu of choices of a range of the input data or the output data, for allowing designation by the permitted range designation means; and the display means displays solely a menu of choices indicating a range of the type of the input data or the output data permitted by the license information, as the menu of choices for allowing designation.

In addition, preferably, the content data creation device according to the present invention consists of at least two modules, and further includes: collation means for collating an operation environment and the license information for each module; and control means for controlling an operation of each module based on a result of collation by the collation means.

In addition, preferably, in the content data creation device according to the present invention, the license information includes user identification information for identifying the user, and the conversion means creates the output data including the user identification information.

In addition, preferably, in the content data creation device according to the present invention, the user identification information is stored in the identification information storage means in an encrypted state.

In addition, preferably, the content data creation device according to the present invention further includes display means for displaying the output data, and the display means displays the user identification information in addition to the output data.

In addition, in the content data creation device according to the present invention, preferably, the license information describes the range of the type of the data of which input or output is permitted by describing a category of data, which represents a subset of an entire input space representing entire range of the type of the data of which input is permitted or an entire output space representing entire range of the type of the data of which output is permitted.

In addition, in the content data creation device according to the present invention, preferably, the category of data refers to a version of the input data or the output data.

A content data creation method according to the present invention is directed to a content data creation method for creating output data for use in a reproduction device by converting input data which is content described by a user in a content data creation device including a storage device, and the content data creation method includes the steps of: storing license information including description of a range of a type of data of which input or output is permitted in the storage device of the content data creation device; designating the input data to be converted; and performing conversion processing on the designated input data in accordance with the license information.

A content data creation program according to the present invention is directed to a content data creation program for creating output data for use in a reproduction device by converting input data which is content described by a user, and the content data creation program causes a computer to execute the steps of: storing license information including description of a range of a type of data of which input or output is permitted; designating the input data to be converted; and creating the output data by performing conversion processing on the designated input data in accordance with the license information.

A content data display device according to the present invention includes: license information storage means for storing encrypted license information including description of a range of a type of data of which input or output is permitted; content data storage means for storing content data encrypted with a method commonly used for the license information; decryption means for decrypting the license information and the content data; and display means for displaying the content data decrypted by the decryption means.

Effects of the Invention

According to the present invention, the range of the output content data is controlled based on the information (such as version) describing a use-permitted range of the content creation software, which is described in the license information file. Thus, the range of the commercially important content data can be controlled for each user.

In addition, according to the present invention, the information on the version displayed to the user as a menu of choices or the like can be controlled for each user, based on the information (such as version) describing a use-permitted range of the content creation software, which is described in the license information file.

In addition, according to the present invention, in controlling display on a user interface, of the version of the descriptive content data of which input is permitted, the non-permitted version of descriptive content data is not displayed, and therefore, operation by the user is simplified.

In addition, according to the present invention, in controlling display on the user interface, of the version of the descriptive content data of which input is permitted by using the use-permitted version of the content creation software described in the license information file, the non-permitted version of the descriptive content data is not displayed, and therefore, operation by the user is simplified.

In addition, according to the present invention, in displaying the non-permitted version of the descriptive content data of the content creation software in a manner different from the permitted version of the descriptive content data, presence of the non-permitted version can constantly be informed of the user.

In addition, according to the present invention, in an embodiment where each component of the software shares the license information while each having a module for interpreting the same, it becomes difficult to take out the component alone and to use it for a purpose departing from its original purpose.

In addition, according to the present invention, in writing in the created content, the user identification information included in the license information of the content creation software or the content conversion software, unauthorized use of the software can be deterred.

In addition, according to the present invention, in writing in the created content, the user identification information included in the license information of the content creation software or the content conversion software and encrypting the same, it becomes difficult to tamper the user identification information written in the content, so that sophisticated unauthorized use can further become difficult.

In addition, according to the present invention, in displaying the user identification information included in the license information of the content creation software or content viewer software simultaneously with or around the timing of display of the content or as a result of a specific operation, unauthorized use of the software can be deterred.

BRIEF DESCRIPTION OF THE DRAWINGS

FIG. 4 illustrates DTD for another version of a descriptive format applied in the content data creation device in FIG. 1.

FIG. 5 illustrates DTD for yet another version of a descriptive format applied in the content data creation device in FIG. 1.

FIG. 6 illustrates exemplary descriptive content data handled in the content data creation device in FIG. 1.

DESCRIPTION OF THE REFERENCE CHARACTERS

Figure 1:
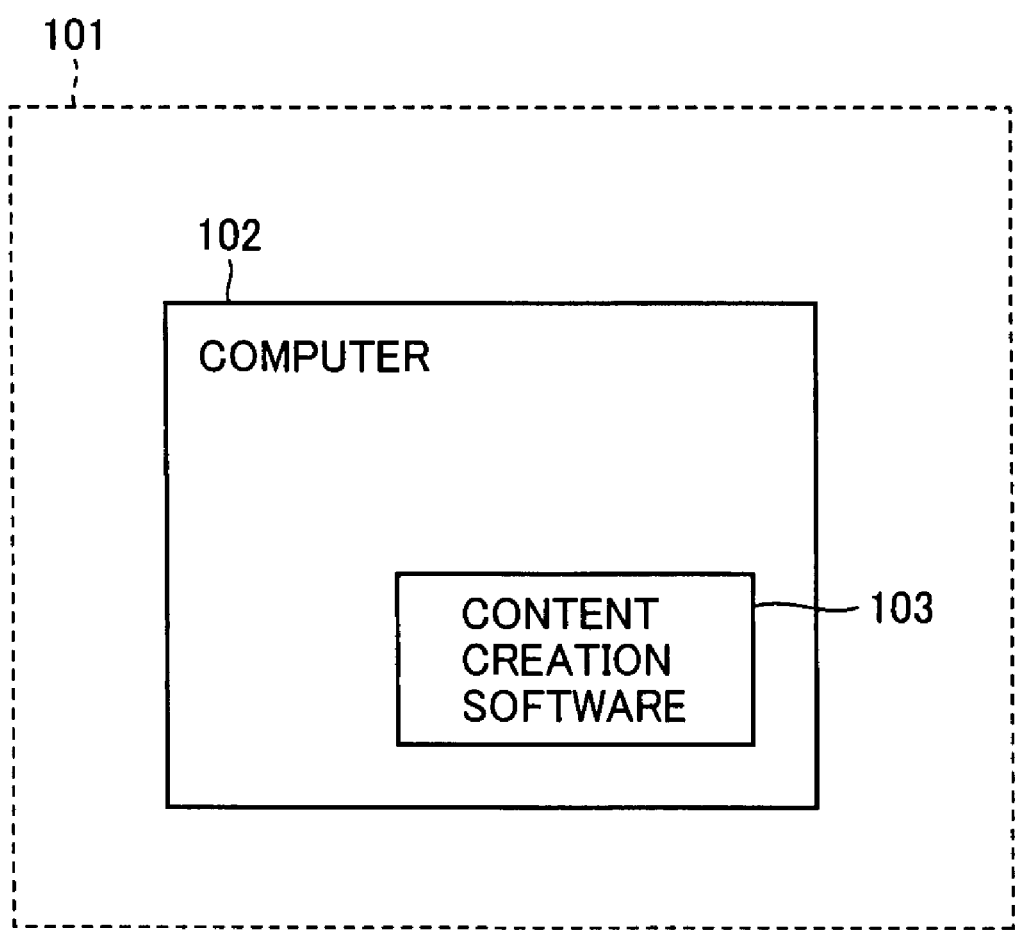
FIG. 1 illustrates an exemplary configuration of a content data creation device according to a first embodiment of the present invention.

101 content data creation device; 102 computer; 103 content creation software; 201 CPU; 202 ROM; 203 RAM; 204 hard disk drive; 205 keyboard; 206 mouse; 207 display; 208 optical disc drive; 209 clock; 210 Ethernet (trademark) card; 211 data bus; 212 communication line; 501, 1001, 1401 GUI manager module; 502, 1002, 1402 content display module; 503, 1003, 1403, 1502, 1602, 1702 license information interpretation module; 504, 1004, 1404 content conversion module; 505, 1005, 1405 descriptive content data storage area; 506, 1006, 1503, 1603, 1703 decryption module; 507, 1007, 1407 DTD storage area; 508, 1008 license information file; 509, 1009, 1406 distribution content data storage area; 601, 707 user identification information; 602 time of start of use; 603 time of end of use; 604 use-permitted first MAC address; 605 use-permitted second MAC address; 606 use-permitted mth MAC address; 607 use-permitted first version; 608 use-permitted second version; 609 use-permitted nth version; 701 text data; 702A to 702K image data; 704A to 704L audio data; 706 version information; 901 main body display portion; 902 scroll bar; 903 exit button; 1011 descriptive content data editor module; 1201 control module; 1202 analysis module; 1203 conversion module; 1204 intermediate content data memory; 1205 encryption module; and 1501, 1601, 1701 main unit module.

BEST MODES FOR CARRYING OUT THE INVENTION

An embodiment of the present invention will be described hereinafter with reference to the drawings. In the description below, the same elements and components have the same reference characters allotted. Their label and function are also identical. Therefore, detailed description thereof will not be repeated.

First Embodiment

FIG. 1 schematically illustrates an exemplary configuration of a content data creation device 101 according to a first embodiment of the present invention.

Referring to FIG. 1, content data creation device 101 is configured by installing content creation software 103 in a computer 102.

Figures 2, 3:
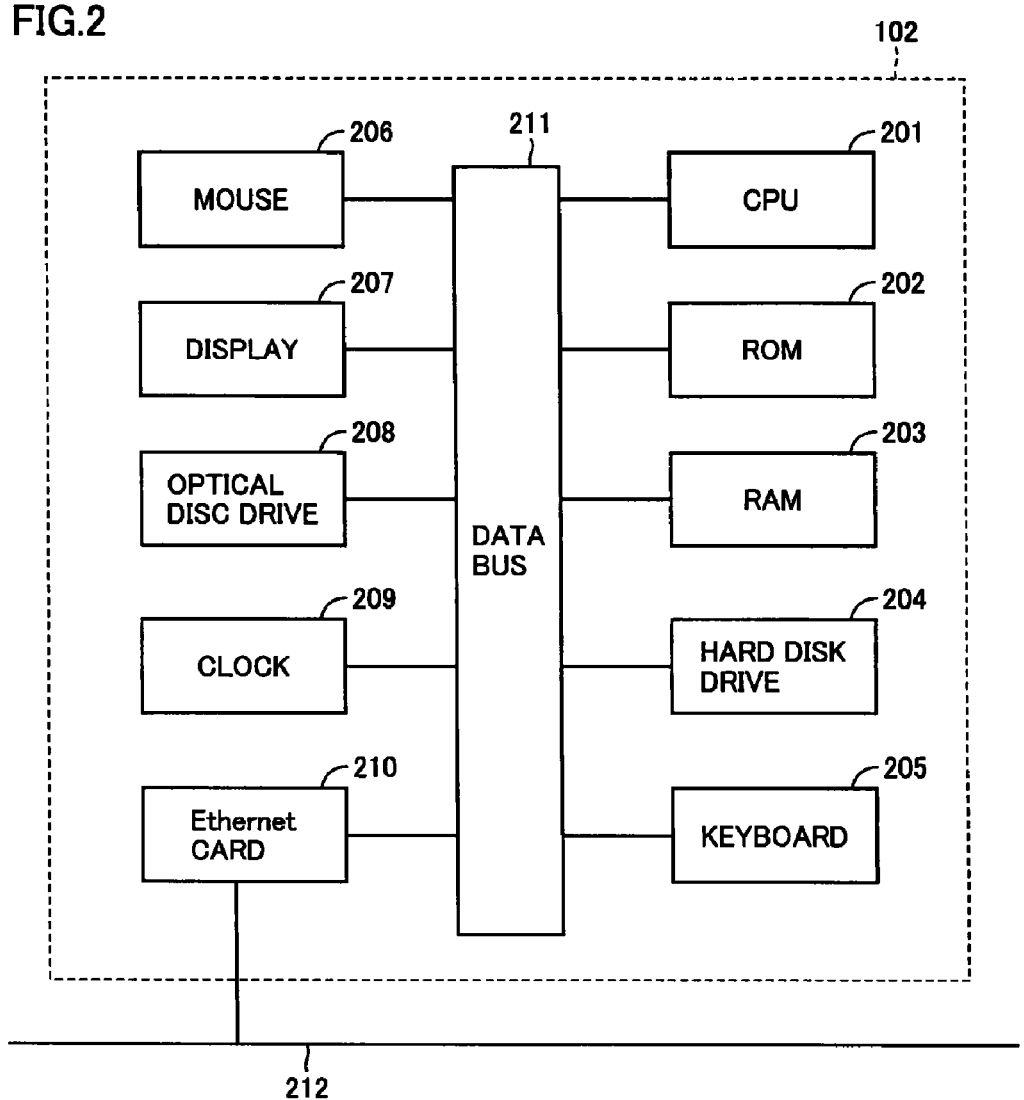
FIG. 2 illustrates an exemplary configuration of a computer in FIG. 1.
FIG. 3 illustrates DTD for a version of a descriptive format applied in the content data creation device in FIG. 1.

FIG. 2 illustrates an exemplary configuration of computer 102.

Computer 102 is constituted of a CPU (Central Processing Unit) 201, an ROM (Read Only Memory) 202, an RAM (Random Access Memory) 203, a hard disk drive 204, a keyboard 205, a mouse 206, a display 207, an optical disc drive 208, a clock 209, and an Ethernet (trademark) card 210, and components are connected to each other via a data bus 211. In addition, Ethernet (trademark) card 210 is also connected to a communication line 212. It is assumed that clock 209 constantly obtains the current time by year, month, day, hour, minute, and second. In the description below, the term "time" refers to information obtained from clock 209 and to information in the format the same as the time timed by clock 209.

Unless otherwise specified, as each component in computer 102 serves similarly to a component in a personal computer generally used in present days, detailed description thereof will not be provided hereinbelow except for matters important for understanding of the invention.

Content creation software 103 refers to software for converting descriptive content data representing content described by a user who is a content creator into intermediate content data that is readily handled in a display device, and for further converting the resultant data to distribution content data encrypted in order to avoid tampering. It is assumed hereinafter that the term "user" in connection with content creation software 103 refers to a content creator.

The descriptive content data consists of an XML (extensible Markup Language) file described in accordance with a pre-defined format (hereinafter, referred to as "descriptive format") as well as an image data file and an audio data file of which file name is specified by a tag in the XML file (hereinafter, collectively referred to as "part data file"), and it is assumed that the descriptive content data is stored in a prescribed area in the hard disk included in hard disk drive 204 (a descriptive content data storage area 505 which will be described later).

In the example hereinafter, 16-bit unicode is assumed as a character code space and other character sets are considered as subsets thereof, however, this is merely by way of example and the present invention is not limited as such.

In the present embodiment, it is assumed that three versions of version1, version2 and version3 are available as descriptive formats. FIGS. 3 to 5 show corresponding DTD (Document Type Definition).

In DTD shown in FIGS. 3 to 5, version2 (see FIG. 4) has upward compatibility over version1 (see FIG. 3), and version3 (see FIG. 5) has upward compatibility over version2.

Specifically, as understood based on comparison between DTD shown in FIG. 3 and DTD shown in FIG. 4, version2 has the tag below added to version1.

<image>
In addition, as understood based on comparison between DTD shown in FIG. 4 and DTD shown in FIG. 5, version3 has the tag below added to version2.
<sound>
<bold>

For example, an XML file descriptive example shown in FIG. 6 (hereinafter, referred to as "sample descriptive content data") includes the <sound> tag and the <bold> tag. Therefore, though the XML file shown in FIG. 6 is valid data as version3 in the present embodiment, it is not valid data as version1 or version2.

In the present embodiment, the file name of DTD is fixed to "book.dtd" designated in line 2 of the XML file, regardless of the version. Therefore, in the present embodiment, as will be described later, DTD for each version is created under a different file name and its file name is changed to "book.dtd" at the time of conversion.

For the sake of brevity, it is noted herein that three types of descriptive format versions are assumed, however, it is naturally clear that the content data creation device in the present embodiment operates similarly if there are 4 or more types of descriptive format versions. In addition, in the present embodiment, upward compatibility is established among versions, which is useful in an application as can be seen later. An embodiment without such a condition, however, is still within the scope of the present invention.

A tag used in the descriptive format in the present embodiment will now be described with reference to the "sample descriptive content data" shown in FIG. 6.

A child element (a portion sandwiched between <book> and </book>) of the <book> tag may be referred to as "content data main body data."

The <char_set> tag refers to a tag representing a name of a character set used for describing the content. In the example shown in FIG. 6, two types of character sets of "JIS X 2101" and "JIS X 2108" are used as character sets.

As its name signifies, "JIS X 2101" refers to a character set defined under JIS X 2101, and normally includes alphanumeric characters, symbols, and half-size katakana represented in 1 byte in the world of personal computers.

"JIS X 2108" refers to a character set defined under JIS X 2108:1997, and it corresponds to JIS level-1 and level-2 kanji sets, full-size alphanumeric characters, and full-size hiragana and katakana in the world of personal computers.

The <author> tag refers to a tag representing an author name, and the character string in the child element represents the author name.

The <text> tag refers to a tag representing the main body, and the character string in the child element represents the main body text.

The <nl> tag represents line feed.

The <image> tag refers to a tag representing an image displayed along with the main body. The filename attribute represents a file name of a displayed image, and the type attribute represents a type of image data stored in a file. The <caption> tag which is the child element of the <image> tag refers to a tag representing text displayed simultaneously with the image, and the character string in the child element represents the displayed text.

The <sound> tag refers to a tag representing voice and sound reproduced along with the main body, and the filename attribute represents a file name of reproduced audio data.

The <bold> tag indicates that the character string in the child element should be displayed in bold type.

Figures 7, 8:
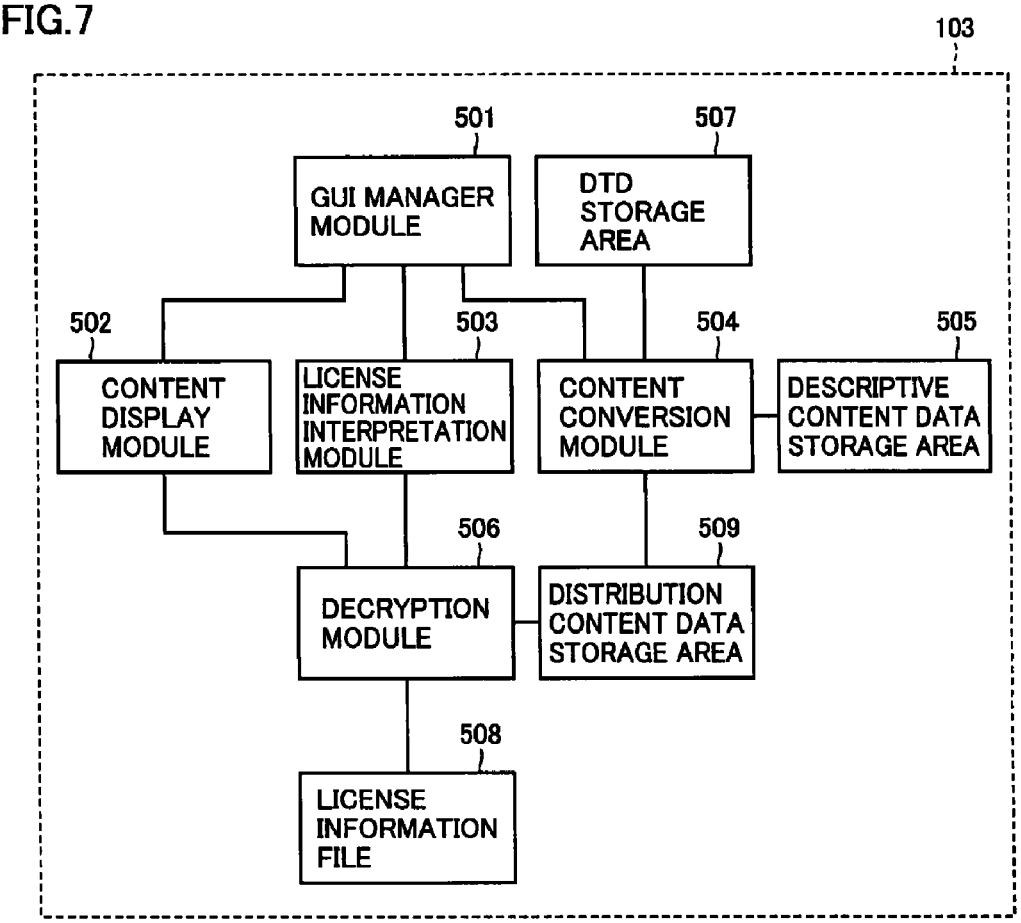
FIG. 7 illustrates a configuration of content creation software in FIG. 1.
FIG. 8 illustrates exemplary information stored in a license information file in FIG. 7.

FIG. 7 illustrates a configuration of content creation software 103.

Referring to FIG. 7, content creation software 103 is configured with a GULI (Graphical User Interface) manager module 501, a content display module 502, a license information interpretation module 503, a content conversion module 504, descriptive content data storage area 505, a decryption module 506, a DTD storage area 507, a license information file 508, and a distribution content data storage area 509.

In FIG. 7, components are connected to each other through lines as appropriate, which means transmission/reception of information between modules but does not necessarily mean hard-wired connection. Naturally, transmission/reception of information shown herein may be carried out actually through hard-wired connection.

Descriptive content data storage area 505, DTD storage area 507 and the distribution content storage area are areas each defined on hard disk drive 204.

License information file 508 is issued every time content creation software 103 is sold, and its content is different for each user. Holding license information file 508 indicates an authorized user.

License information file 508 is encrypted, and license interpretation module 502 reads the content thereof by means of decryption module 506. Accordingly, decryption module 506 is involved whenever the content in license information file 508 is read, however, the operation of decryption module 506 is not mentioned each time.

Here, it is assumed that the file name of license information file 508 is fixed to "license.dat". Such assumption is made in order to allow license interpretation module 503 to identify license information file 508. If another method allowing such identification is available, however, it is not necessary to fix the file name of license information file 508. For example, the same object can be achieved also in such a manner that a header structure present only in the license information file may be predetermined and license interpretation module 502 searches for a file having such a header structure.

As any method of encrypting license information file 508 may be employed provided that encryption level and decryption speed are satisfactory, detailed description will not be provided. For example, "DES (Data Encryption Standard)" represents an exemplary, widely used encryption method. It goes without saying that the primary reason why license information file 508 is encrypted is to prevent a malicious user from falsifying and using the file.

FIG. 8 illustrates exemplary information stored in license information file 508.

As user identification information 601, a user name given to the user of content creation software 103 is stored in the form of character string.

As time of start of use 602, information specifying the time at which use of content creation software 103 can be started is stored.

As time of end of use 603, information specifying the time at which use of content creation software 103 is disabled is stored. Naturally, for example, information having substantially the same content, such as information specifying the time until when use of content creation software 103 is permitted, may be stored.

As a use-permitted first MAC address 604, a MAC address of a computer, in which use of content creation software 103 is permitted, is stored.

The MAC address refers to a specific number allocated to and stored in an individual Ethernet (trademark) card across the world, and normally it may be considered unique to the individual Ethernet (trademark) card. Naturally, the MAC address is allocated to and stored in Ethernet (trademark) card 210.

In license information file 508, a use-permitted second MAC address 605, . . . and a use-permitted mth MAC address 606 can be designated, in addition to use-permitted first MAC address 604. The value of m is different, depending on the number of designated MAC addresses.

As a use-permitted first version 607, the version of the descriptive content data which may be used in content creation software 103 is stored in the form of character string.

In license information file 508, a use-permitted second version 608, . . . and a use-permitted nth version 609 can be designated, in addition to use-permitted first version 607. The version of the descriptive format that may be used, i.e., permitted, with content creation software 103 is stored in the form of character string. Therefore, in the present embodiment, any of "version1", "version2" and "version3" is designated. In the following, for the sake of understanding, the term "version" simply refers to the version of the descriptive format.

The value of n is different, depending on the number of designated versions. In the example described herein, there are three types of versions and the number of n is 3 at the maximum, however, the number of versions may be smaller.

It is assumed here that each version is stored in the form of character string. If interpretation by content creation software 103 as the version is possible, however, other formats such as numeric values may be adopted (for example, numeric values such as 1, 2 and 3, instead of storing the character string such as "version1", "version2" and "version3"). In summary, it is storage of the information designating the version that matters.

Figure 9:
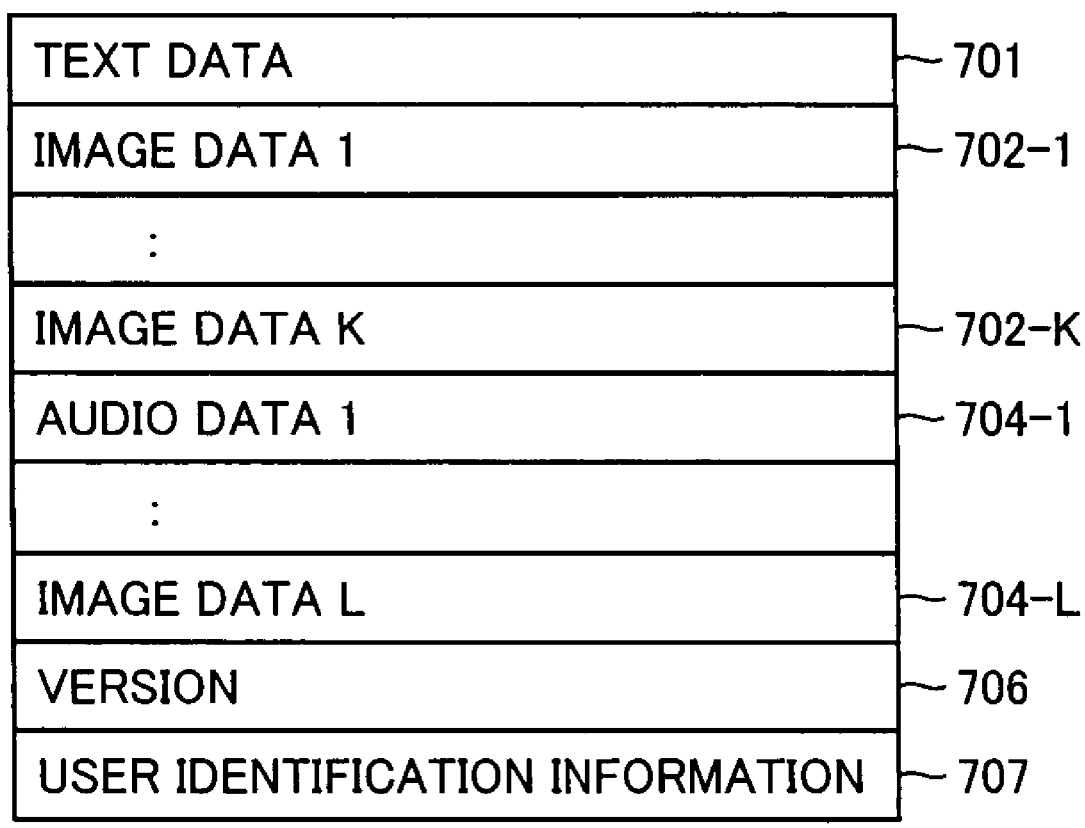
FIG. 9 illustrates an exemplary configuration of intermediate content data created by using the content creation software in FIG. 1.

FIG. 9 illustrates an exemplary configuration of intermediate content data in the present embodiment. International Publication 02/103554 filed by the applicant of the subject application discloses an example of such structured data.

The intermediate content data includes text data 701, K pieces of image data 702-1 to 702-K, L pieces of audio data 704-1 to 704-L, version information 706 which is information for specifying the version of the software used for generating the intermediate content data (such as a character string representing the version), and user identification information 707 which is information for specifying the user of the software used for creating the intermediate content data.

Here, text data 701 refers to structured data consisting of electronic data having a hierarchical structure and block auxiliary data for processing the electronic data by dividing the same in a plurality of blocks. Here, user identification information 707 is the same as user identification information 601.

Figure 10:
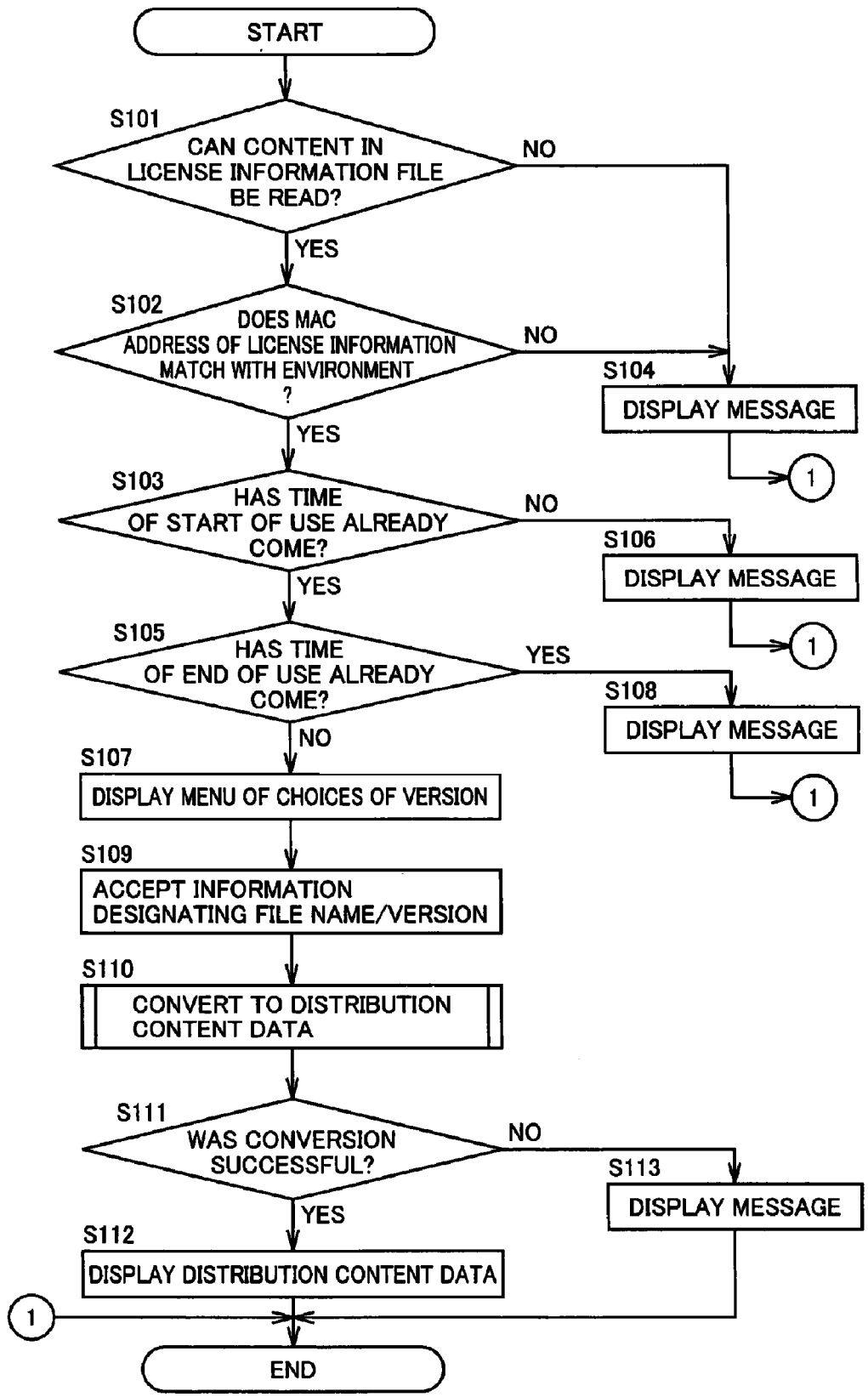
FIG. 10 is a flowchart for illustrating an operation performed as a result of execution of the content creation software in FIG. 1.

FIG. 10 is a flowchart for illustrating an operation performed as a result of execution of content creation software 103.

Referring to FIG. 10, when the phase "conversion" of data is designated in the software, in step S101 (hereinafter, "step" is abbreviated), GUI manager module 501 determines whether or not the content in license information file 508 can be read. If it is successful, the process proceeds to S102, and otherwise, the process proceeds to S104. Here, possible cause of unsuccessful reading includes absence of license information file 508, unsuccessful decryption due to corruption of data content despite presence of license information file 508, and the like.

In S102, license information interpretation module 503 determines, based on comparison, whether any of use-permitted first MAC address 604, use-permitted second MAC address 605, . . . and use-permitted mth MAC address 606 within license information file 508 matches with the MAC address of Ethernet (trademark) card 210. If the MAC addresses match, the process proceeds to S103, and otherwise, the process proceeds to S104.

In S103, license information interpretation module 503 determines whether or not time of start of use 601 in license information file 508 has already come (whether the current time obtained from clock 209 is the same as time of start of use 601 or it indicates the time later than time of start of use 601). If time of start of use 601 has already come, the process proceeds to S105, and otherwise, the process proceeds to S106.

In S105, license information interpretation module 503 determines whether or not time of end of use 602 has already come (whether the current time obtained from clock 209 is the same as time of end of use 602 or it indicates the time later than time of end of use 602). If time of end of use 602 has not yet come, the process proceeds to S107, and if time of end of use 602 has already come, the process proceeds to S108.

According to the processing so far, content creation software 103 performs collation between the license information included in license information file 508 (particularly, description of the operation environment where start or operation of content creation software 103 is permitted) and the current environment.

The information on the operation environment included in license information file 508 includes an identification number of the CPU, a volume label of the hard disk, and the like, as the information for identifying the system, in addition to the examples given above.

In addition, in such a system as having means for taking out a physical position thereof (GPS (Global Positioning System) and the like), it is possible that license information file 508 is described by using a condition of the physical position where the software operates as the operation environment, so that collation is performed at the time of start or operation of the software. In such a case, if the physical position cannot be taken out, the software is not started, determining as collation has failed.

Alternatively, presence of specific software in the same system can also serve as the condition for start or operation. Such a configuration is effective for preventing use of a tool (program or module) alone, that should operate as a set.

Variations depending on types of operation environments of the software described in such license information file 508 are all within the scope of the present invention.

In S107, GUI manager module 501 displays a menu of choices of the version of the descriptive format on display 207. Here, all use-permitted versions described in license information file 508 and taken out by license information interpretation module 503 are displayed as the menu of choices.

Figure 11:
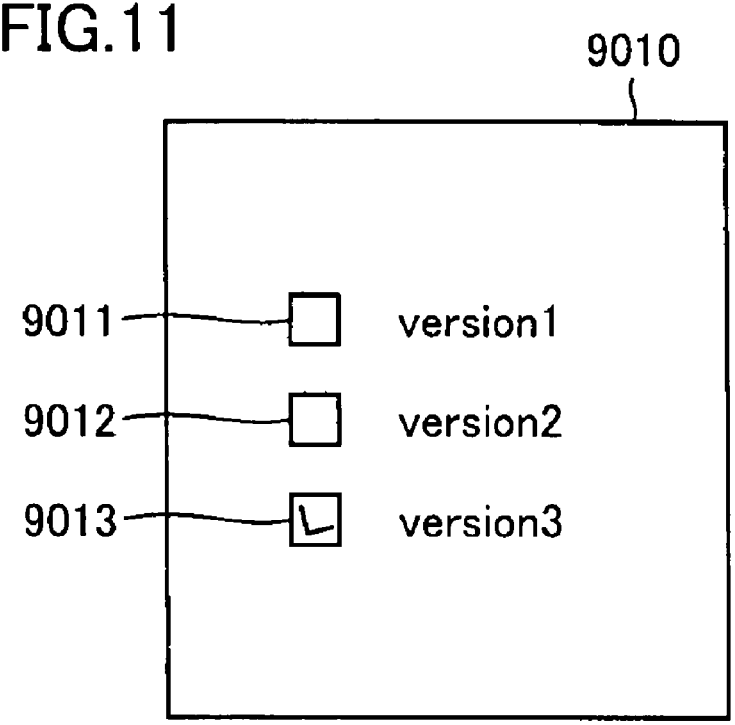
FIG. 11 illustrates an example of a display manner on a display in accordance with processing in the flowchart in FIG. 10.

FIG. 11 illustrates an example of a screen 9010 which shows display corresponding to a case where all of "version1", "version2" and "version3" are designated as use-permitted versions in license information file 508. Referring to FIG. 11, display 207 displays on screen 9010, "version1", "version2" and "version3" that are character strings representing respective versions, as the menu of choices. In addition, radio buttons 9011 to 9013 to be checked when each version is selected are displayed on the left of the character string representing each version.

Figure 12:
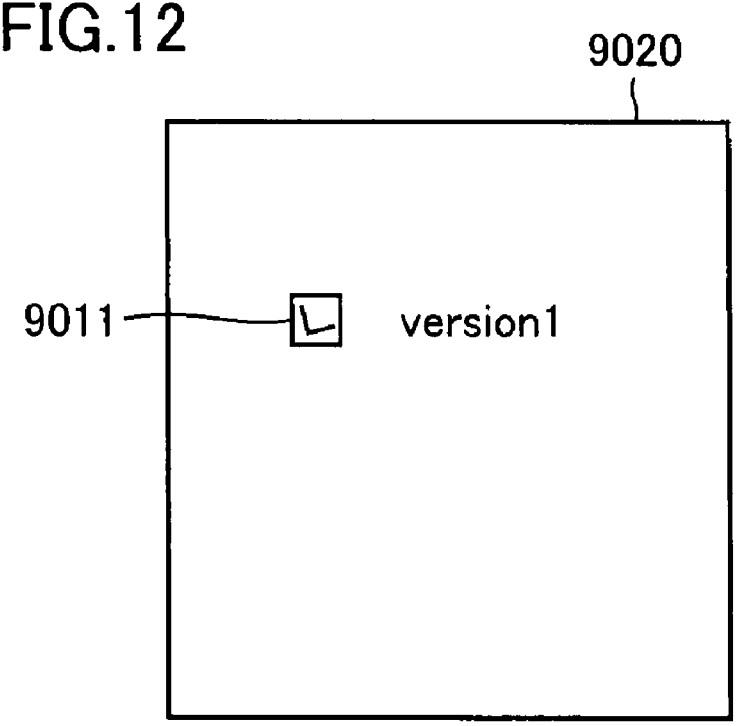
FIG. 12 illustrates another example of a display manner on the display in accordance with processing in the flowchart in FIG. 10.

Meanwhile, FIG. 12 illustrates an example of a screen 9020 which shows display corresponding to a case where solely "version1" is designated as a use-permitted version in license information file 508. Unlike screen 9010, in screen 9020, solely "version1" is shown as a choice and solely radio button 9011 is displayed.

In license information file 508 of the present embodiment, as the character strings representing the version are stored as use-permitted first version 607, use-permitted second version 608, . . . and use-permitted nth version 609, the character string s can be displayed as they are in S107. If the version is stored in another format in license information file 508, it should be converted to the character string representing the version and then displayed.

In addition, in S107, the version of which use is not permitted may also be displayed together.

In S109, GUI manager module 501 accepts from the user, input of information designating the version of the descriptive format, along with input of information designating the descriptive content data, based on the information displayed in S107. Here, the information designating the descriptive content data includes, for example, the file name of the descriptive content data.

In such an embodiment as the sample descriptive content data, the file name of the image data file or the file name of the audio data file have already been designated in the XML file. Therefore, if such descriptive content data is to be processed, in S109, only by designating a single XML file name, remaining part data files are automatically designated. If a plurality of part data files should be designated, designation of a plurality of files may be accepted in S109.

In S110, GUI manager module 501 starts content conversion module 504, converts the descriptive content data, of which designation has been accepted in S109, to the distribution content data, and stores the resultant distribution content data in distribution content data storage area 509. Here, GUI manager module 501 passes, as the parameter, the version of the descriptive format and the file name of the descriptive content data to content conversion module 504.

As a variation of the embodiment described herein, an embodiment where designation of the version of the descriptive format itself is described in the descriptive content data may be possible. For example, in the case of XML, a dedicated tag is used for description in the descriptive content data. In such a case, the same effect is obtained in that the file name of DTD that has been common to all versions is made different among the versions for allowing identification thereof, and the file name is designated as it is in the XML data. In such an embodiment, if only a scheme for allowing the version to be taken out from among the descriptive formats is prepared, the version is determined at the time point of designation of the descriptive content data, and therefore, necessity of the processing in S107 is obviated. In addition, it is no longer necessary to accept designation of the version in S109. Moreover, it is also no longer necessary to pass, as the parameter, the version of the descriptive format to content conversion module 504 in S110.

Figure 13:
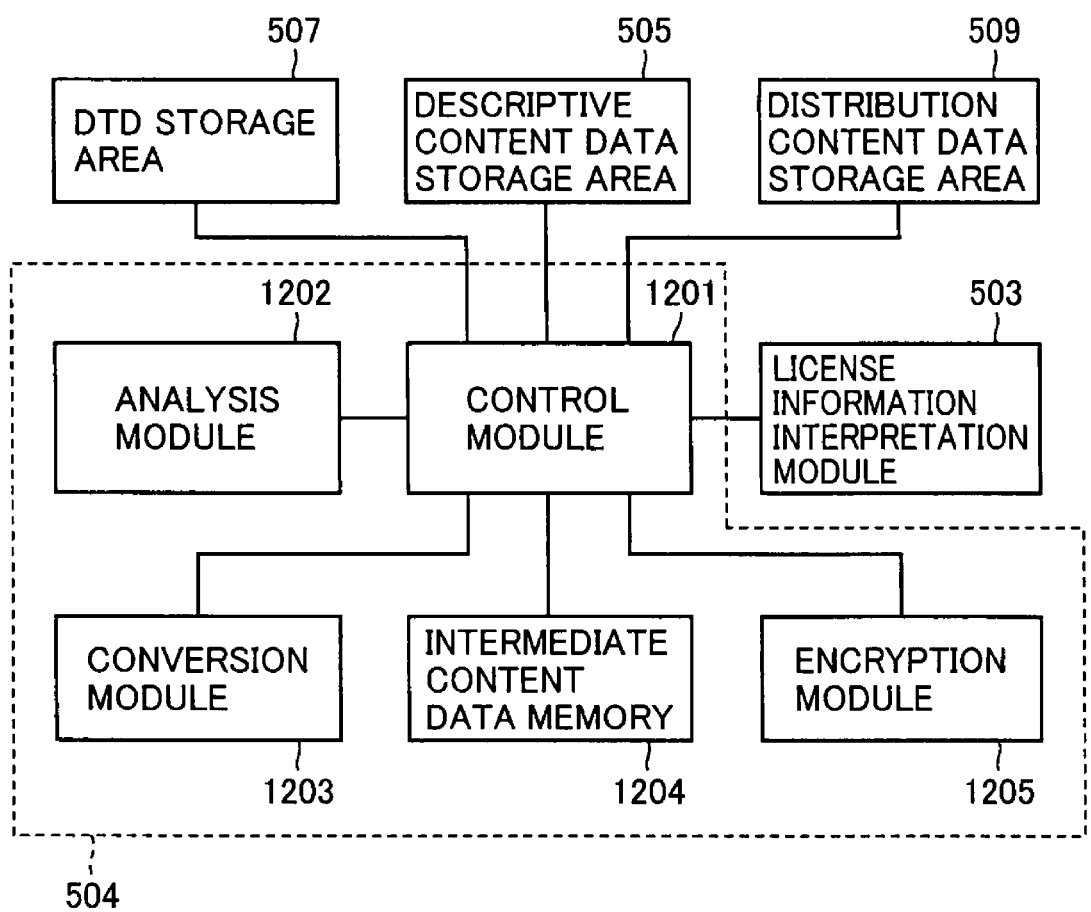
FIG. 13 illustrates a configuration of a content conversion module in FIG. 7.

FIG. 13 illustrates a configuration of content conversion module 504.

Referring to FIG. 13, content conversion module 504 consists of a control module 1201, an analysis module 1202, a conversion module 1203, an intermediate content data memory 1204, and an encryption module 1205. Content conversion module 504 is connected to license information interpretation module 503, descriptive content data storage area 505, DTD storage area 507, and distribution content data storage area 509, via control module 1201.

Figure 14:
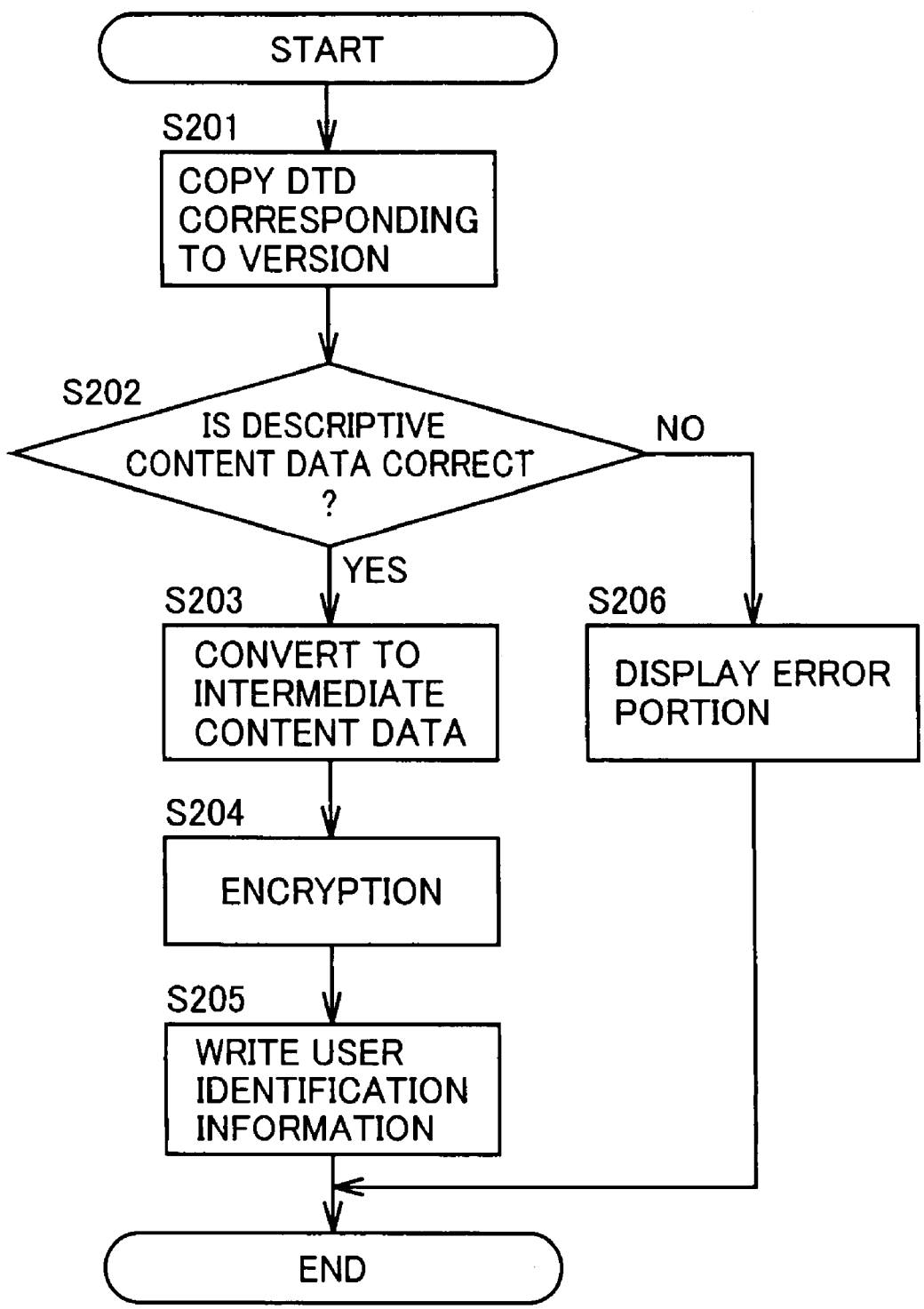
FIG. 14 is a flowchart illustrating an operation of the content conversion module in FIG. 7.

FIG. 14 is a flowchart illustrating an operation of content conversion module 504 in S110. Referring to FIGS. 13 and 14 hereinafter, the processing for converting the descriptive content data to the distribution content data will be described.

In data conversion, initially in S201, control module 1201 reads from DTD storage area 507, DTD corresponding to the version described in license information file 508 and designated in S109, and copies DTD to descriptive content data storage area 505.

Here, DTD corresponding to each version is stored in DTD storage area 507 under a file name different for each version. Here, it is assumed that DTD corresponding to version1 is denoted as "version1.dtd", DTD corresponding to version2 is denoted as "version2.dtd", and DTD corresponding to version3 is denoted as "version3.dtd". As described already, the name of DTD is fixed to "book.dtd" in the descriptive data content. Therefore, in S201, the file name of DTD corresponding to the designated version among DTDs stored in DTD storage area 507 is changed to "book.dtd" and then copied.

Thereafter, in S202, control module 1201 starts analysis module 1202 and checks whether or not the input descriptive content data is correct as the descriptive format. DTD has already been copied under the file name "book.dtd". Therefore, checking of the XML data is possible based on comparison between the DTD above and the descriptive content data. As to other part data files as well, for example, in the case of JPEG, checking as to whether the header structure of JPEG is present or not is possible. If the content in the descriptive content data is correct, the process proceeds to S203, and otherwise, the process proceeds to S206.

In S206, control module 1201 displays an incorrect portion as an error portion on display 207, and the process ends without performing data conversion.

Meanwhile, in S203, control module 1201 starts conversion module 1203, converts the input descriptive content data to the intermediate content data which is the data in the pre-defined format (hereinafter, referred to as "intermediate format"), and stores the resultant intermediate content data in intermediate content data memory 1204. The main reason why conversion to the intermediate content data different from the descriptive content data is performed is because of possibility that the format convenient for description is not necessarily convenient for a viewer (reproduction apparatus).

Naturally, if the descriptive content data as it is suitable for use in the viewer, the processing in S203 is not essential, and conversion module 1203 may not be provided.

Thereafter, in S204, control module 1201 starts encryption module 1204, encrypts the intermediate content data to create the distribution content data, and stores the distribution content data in distribution content data storage area 505. Here, use of the encryption method in encryption module 1204 the same as that for encryption of license information file 508 contributes to simplification of the system configuration as can be seen later.

Thereafter, in S205, control module 1201 writes user identification information 601 (user identification information 707) in the created distribution content data. Thus, even if an authorized user (referred to as "user A") of content creation software 103 copies and passes content creation software 103 to another user (referred to as "user B"), the identification information of user A has been written in the distribution content data created by user B. The fact itself serves as mental deterrent to unauthorized copy of content creation software 103. In addition, as the user identification information of user A is contained in the content created by user B, the fact that content creation software 103 was copied by user A or user B can be discovered, which also serves as deterrent to unauthorized copy. In view of such a purpose, in writing of user identification information 601 as well, user identification information 601 is desirably encrypted by using encryption module 1204 in order to prevent a malicious user from falsifying the user identification information. Naturally, in S205, information serving to specify user identification information 601 should only be written, without user identification information 601 itself being written (if narrowing down to such an extent as deterring a malicious person from unauthorized use is possible, the scheme above is nevertheless effective, even though user identification information 601 cannot necessarily uniquely be specified).

As described above, after the processing shown in FIG. 14 is performed, the processing in content conversion module 504 in S110 in FIG. 10 ends. Depending on the configuration of the distribution content data, the order of processing is switched between encryption of the intermediate content data in S204 and writing of user identification information 601 in S205. Specifically, user identification information 601 may be written in the intermediate content data, and thereafter the intermediate content data may be encrypted. This is effective in that a malicious user has further difficulty in taking out and tampering the portion of the distribution content data corresponding to user identification information 601.

In S206 in the processing shown in FIG. 14, control module 1201 displays on display 207 the error portion of the descriptive content data, which is the cause of failure in analysis. Normally, if there is an error, further analysis becomes difficult in many cases. Accordingly, the error discovered first is displayed, however, naturally all errors that are discovered may be displayed where possible. For example, as a method of displaying the error portion, a row number and a file name may be displayed in the case of an XML file, and a file name may be displayed in the case of other part data files. Here, the processing in content conversion module 504 in S110 thus ends.

Referring again to FIG. 10, in S111 following S110, GUI manager module 501 determines whether conversion in S110 has been successful or not. If it has been successful, the process proceeds to S112, and if it has failed, the process ends.

In S112, GUI manager module 501 starts content display module 502, and displays the distribution content data stored in distribution content data storage area 509.

Here, as the distribution content data has been encrypted, a module for decrypting the encrypted data is necessary. As described in connection with the processing in content conversion module 504, as the encryption method the same as that for encryption of license information file 508 is used in encryption module 1204, the module used for decryption of encrypted license information file 508 can commonly be used for decrypting the encrypted distribution content data. According to such a configuration, the configuration of the device can be simplified. In the case of the software, reduction in development cost and improvement in reliability can be achieved. In the case of the software, a capacity of a disc or the like necessary for storage can be suppressed. In the case of the hardware, the device can be smaller in size, and reduction in the number of parts and power consumption can be achieved.

In the configuration shown in FIG. 7, premised on the above-described feature, content display module 502 reads the distribution content data by means of decryption module 506.

Naturally, the encryption method used for encryption of license information file 508 may be different from the encryption method used for encryption of the distribution content data. Here, though the advantage as above cannot be obtained because of necessity of a decryption module dedicated for content display module 502 instead of decryption module 506, such an embodiment is still within the scope of the present invention.

The distribution content data resulting from conversion of the sample descriptive content data in S110 is hereinafter referred to as "sample distribution content data".

Figure 15:
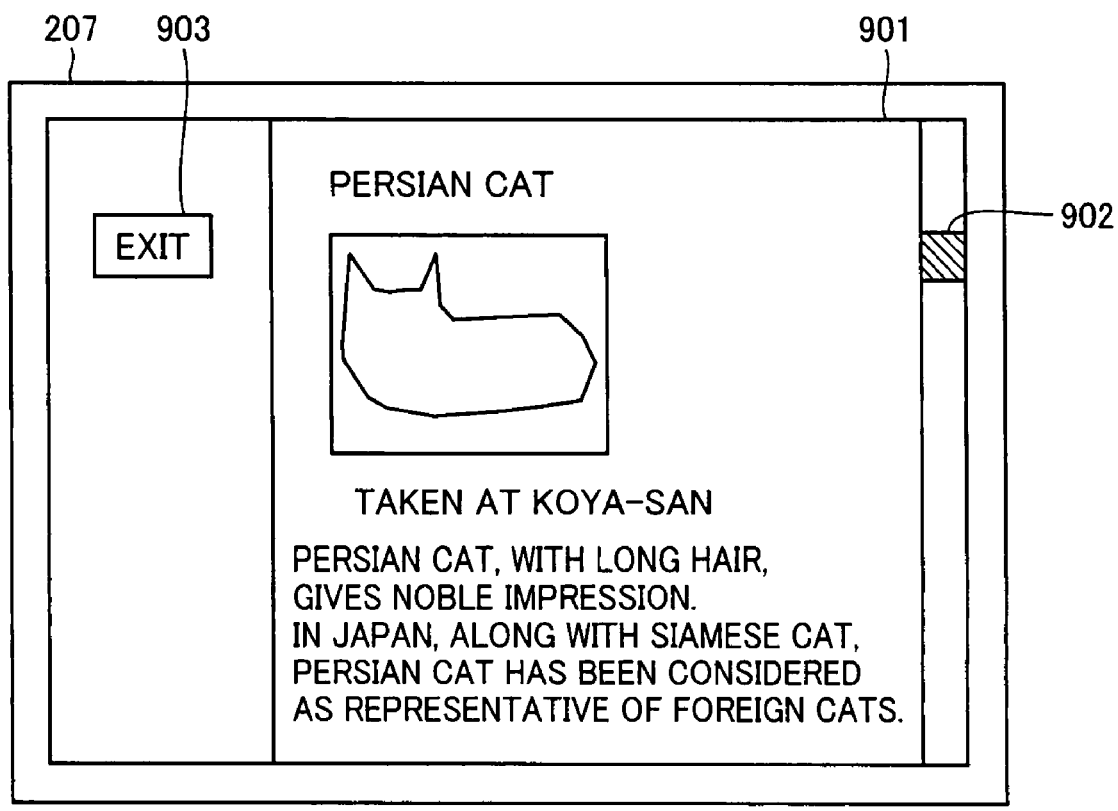
FIG. 15 illustrates a display example of sample distribution content data on the display in FIG. 2, as a result of processing in FIG. 10.

FIG. 15 illustrates a display example of the sample distribution content data in S112.

Content display module 502 displays a scroll bar 902 and an exit button 903, in addition to display of the distribution content data in a main body display portion 901 representing one area of display 207. When scroll bar 902 is dragged by using mouse 207, main body display portion 901 is scrolled, which is the same as in a general personal computer. When exit button 903 is clicked with mouse 207, display of the content in main body display portion 801 ends. The processing of content creation software 103 thus ends.

Referring again to FIG. 10, in S104, GUI manager module 501 displays a message that "the use-permitted MAC address does not match with the MAC address of the computer" on display 207, and the process ends.

In addition, in S106, GUI manager module 501 displays a message that "the time of start of use has not yet come" on display 207, and the process ends.

Moreover, in S108, GUI manager module 501 displays a message that "the time of end of use has come" on display 207, and the process ends.

In addition, in S113, GUI manager module 501 displays a message that "reading from the license information file was unsuccessful" on display 207, and the process ends.

Figure 16:
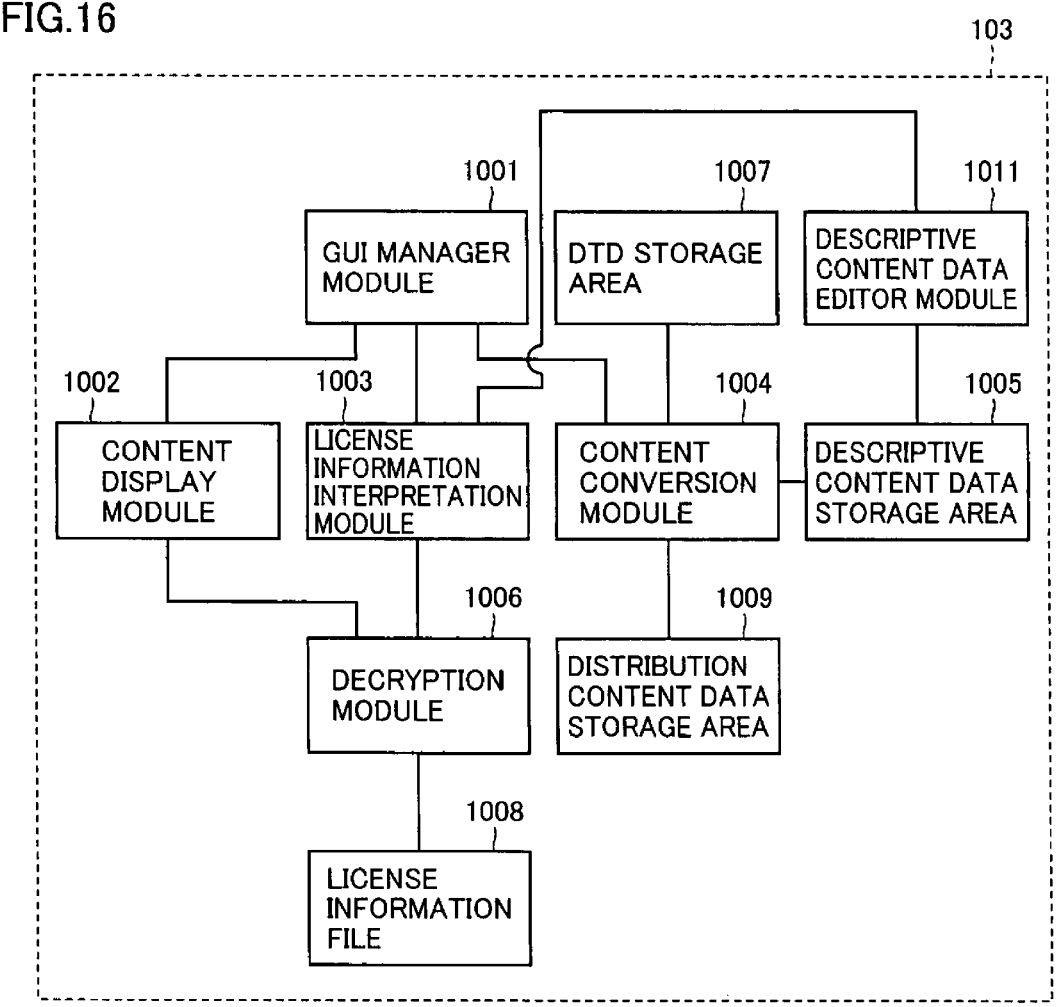
FIG. 16 illustrates a variation of the configuration of the content creation software in FIG. 1.

In the present embodiment, the description has been given with reference to an embodiment where content creation software 103 creates the distribution content data by converting the descriptive content data that has already been created by using another means, however, content creation software 103 may attain a function to create all or a part of the part data file configuring the descriptive content data. FIG. 16 shows such a configuration example.

Content creation software 103 shown in FIG. 16 includes a GUI manager module 1001, a content display module 1002, a license information interpretation module 1003, a content conversion module 1004, a descriptive content data storage area 1005, a decryption module 1006, a DTD storage area 1007, a license information file 1008, a distribution content data storage area 1009, and a descriptive content data editor module 1011.

The configuration of content creation software 103 shown in FIG. 16 is the same as that shown in FIG. 7, except that descriptive content data editor module 1011 capable of editing the descriptive content data stored in descriptive content data storage area 1005 is further included.

Figure 17:
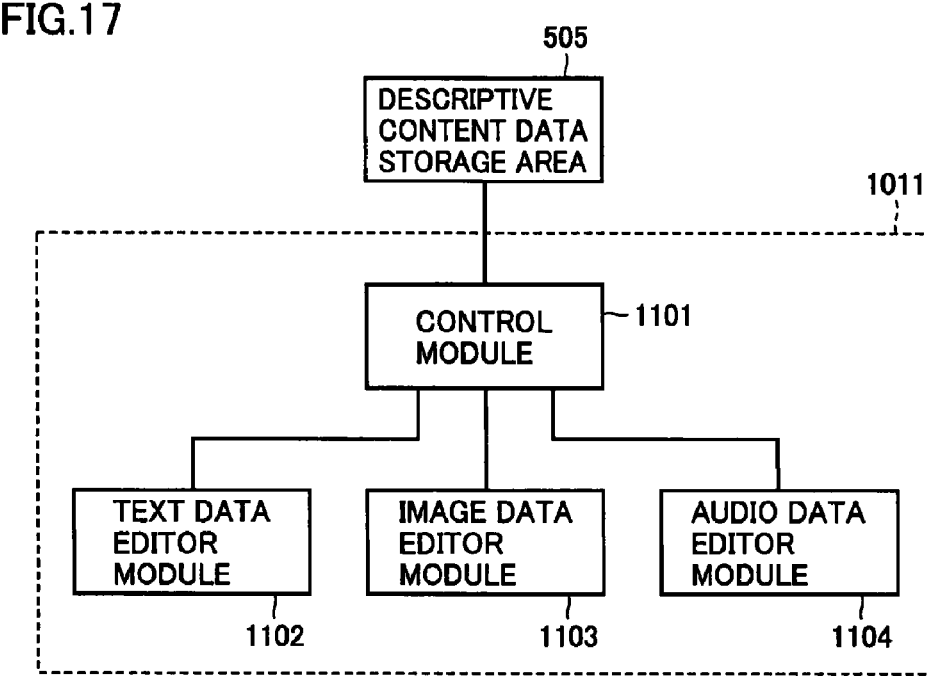
FIG. 17 illustrates a configuration of a descriptive content data editor module in FIG. 16.

FIG. 17 illustrates a configuration of the descriptive content data editor module.

Referring to FIG. 17, descriptive content data editor module 1011 is configured with a control module 1101 for overall control, a text data editor module 1102 serving as an editor for editing an XML file, an image data editor module 1103 serving as an editor for editing an image data file, and an audio data editor module 1104 serving as an editor for editing an audio data file.

Control module 1101 starts any of text data editor module 1102, image data editor module 1103, and audio data editor module 1104, depending on an extension of a file designated by the user.

Each component of text data editor module 1102, image data editor module 1103 and audio data editor module 1104 attains a function to cause the user to newly create part data, a function to load the part data file from hard disk drive 204, a function to edit the part data file obtained with any means mentioned above, and a function to save the part data edited by the user in hard disk drive 204. It is clear that each of these modules can be implemented by the software and that the descriptive content data configured with part data files saved in hard disk drive 204 by means of the software can be used as input of a series of processing starting from S101.

Second Embodiment

A content data creation device according to a second embodiment of the present invention is configured in such a manner that license information interpretation module 503 and decryption module 506 that have been shared among GUI manager module 501, content display module 502 and content conversion module 504 in the first embodiment are possessed by each module. Therefore, the operation thereof can mostly be understood based on the description of the first embodiment. Thus, in the following, the content data creation device in the present embodiment will be described, focusing on the difference from the first embodiment. For the sake of understanding, the reference numerals used in the first embodiment are also used here.

Figure 18:
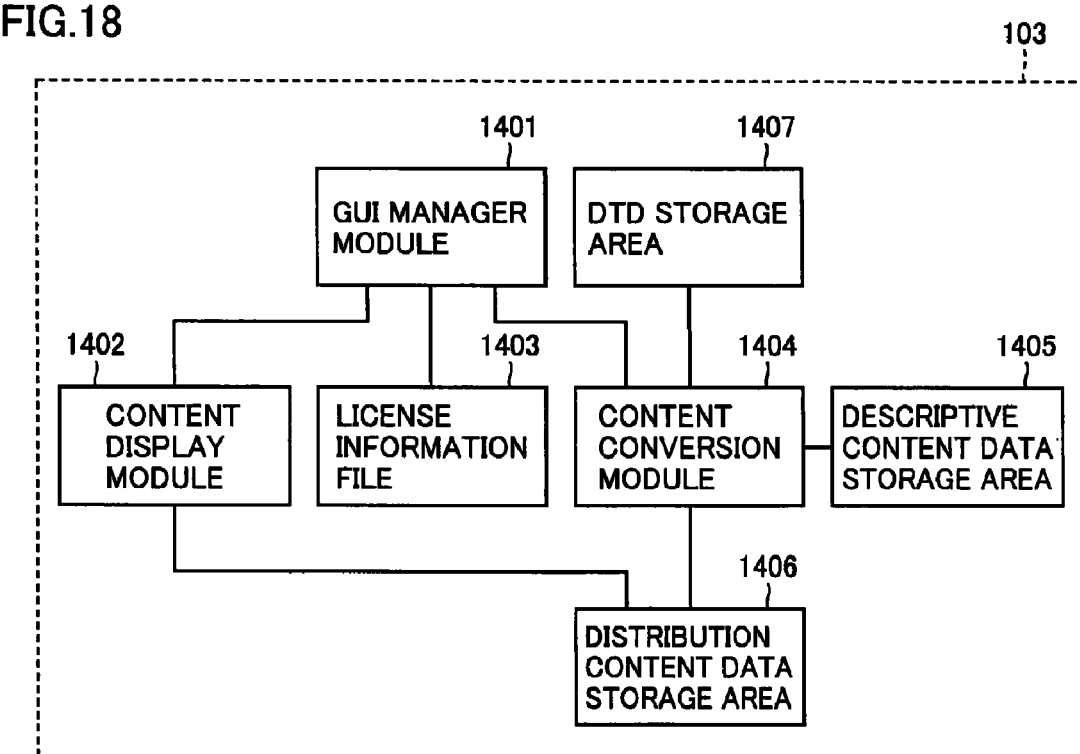
FIG. 18 illustrates a configuration of content creation software in a content data creation device according to a second embodiment of the present invention.

As shown in FIG. 18, content creation software 103 in the present embodiment includes a GUI manager module 1401, a content display module 1402, a license information file 1403, a content conversion module 1404, a descriptive content data storage area 1405, a distribution content data storage area 1406, and a DTD storage area 1407.

In content creation software 103 of the present embodiment, the configuration and the operation of license information file 1403, descriptive content data storage area 1405, distribution content data storage area 1406, and DTD storage area 1407 are exactly the same as those of corresponding elements in the content data creation device according to the first embodiment described with reference to FIG. 7.

Figure 19:
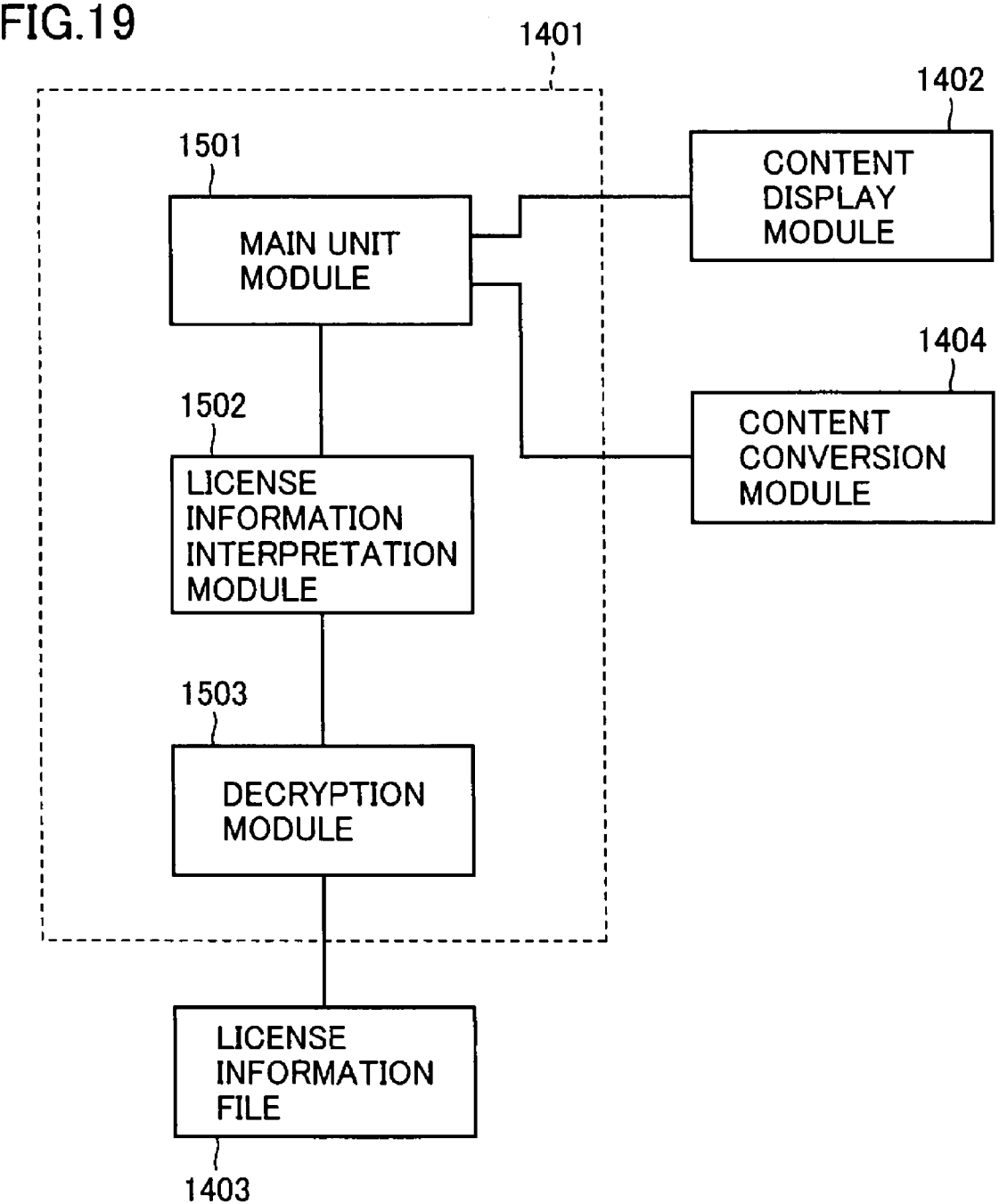
FIG. 19 illustrates a detailed configuration of a GUI manager module in FIG. 18.

FIG. 19 illustrates a detailed configuration of GUI manager module 1401.

Referring to FIG. 19, GUI manager module 1401 is configured with a main unit module 1501, a license information interpretation module 1502 and a decryption module 1503. The configuration and the operation of main unit module 1501 are the same as those of GUI manager module 501 in the first embodiment. In addition, similarly, the configuration and the operation of license information interpretation module 1502 and decryption module 1503 are the same as those of license information interpretation module 503 and decryption module 506 respectively.

Figure 20:
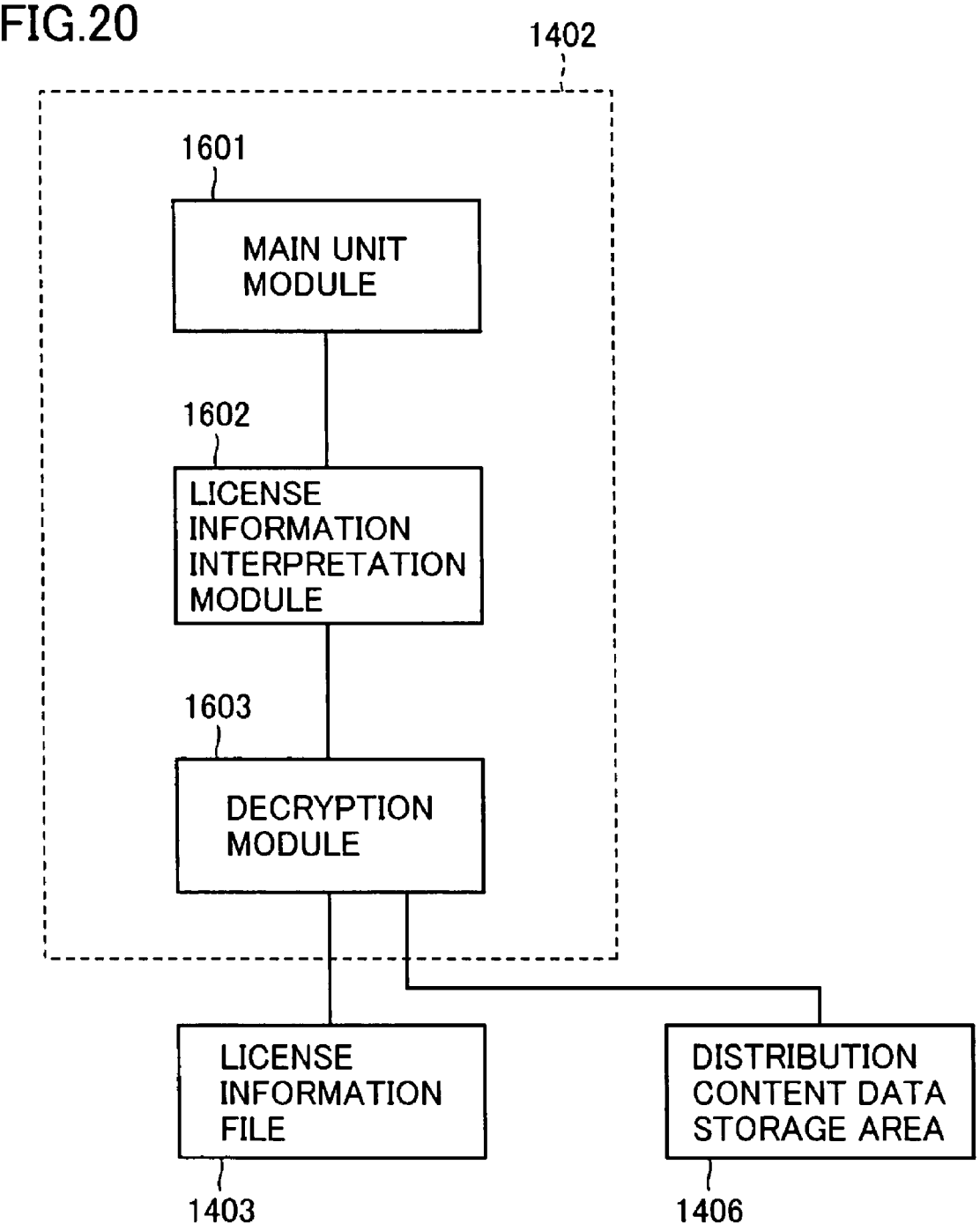
FIG. 20 illustrates a detailed configuration of a content display module in FIG. 18.

FIG. 20 illustrates a detailed configuration of content display module 1402.

Referring to FIG. 20, content display module 1402 is configured with a main unit module 1601, a license information interpretation module 1602 and a decryption module 1603. The configuration and the operation of main unit module 1601 are the same as those of content display module 502 in the first embodiment. In addition, similarly, the configuration and the operation of license information interpretation module 1602 and decryption module 1603 are the same as those of license information interpretation module 503 and decryption module 506 respectively.

Figure 21:
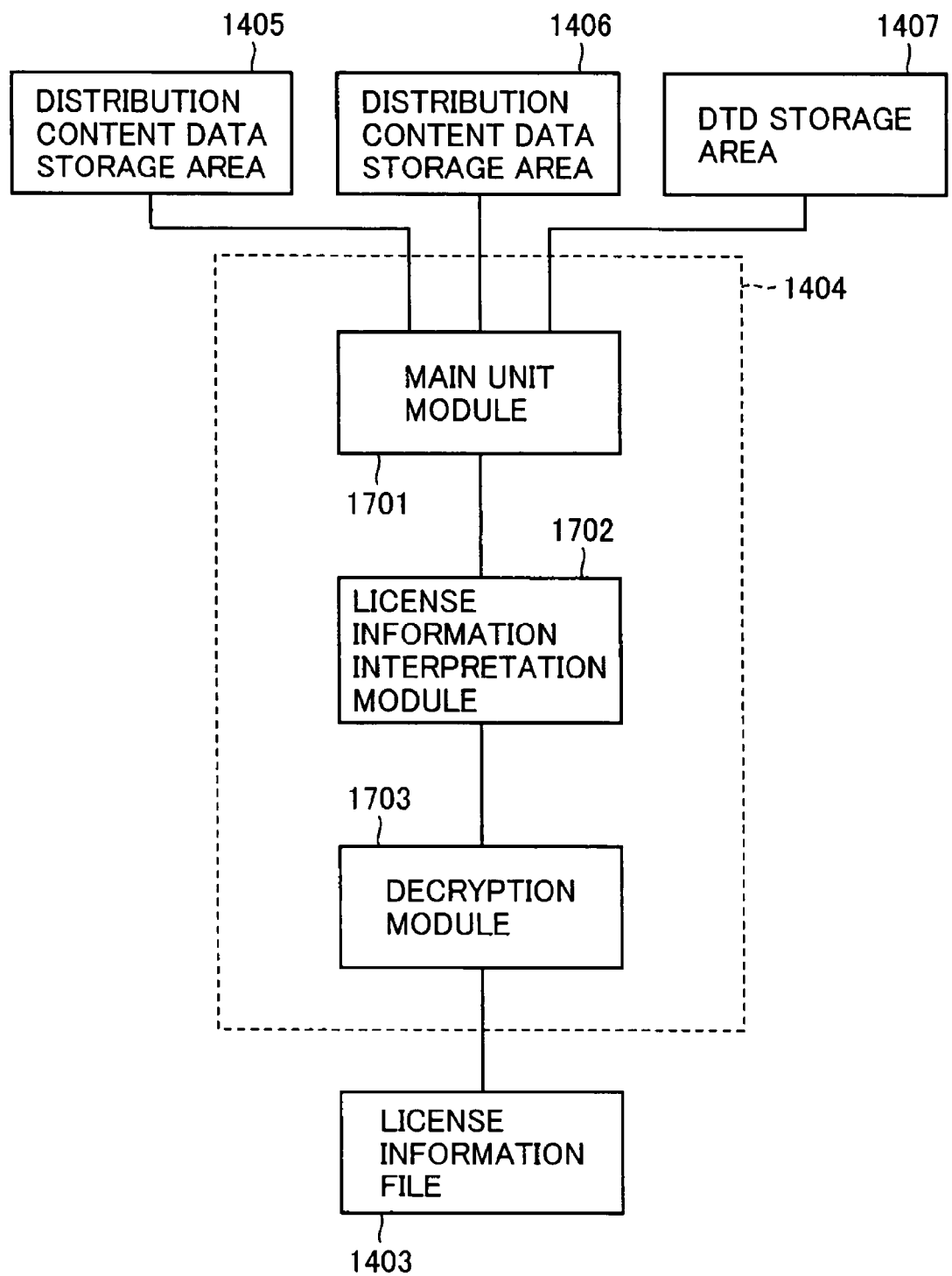
FIG. 21 illustrates a detailed configuration of a content conversion module in FIG. 18.

FIG. 21 illustrates a detailed configuration of content conversion module 1404.

Referring to FIG. 21, content conversion module 1404 is configured with a main unit module 1701, a license information interpretation module 1702 and a decryption module 1703. The configuration and the operation of main unit module 1701 are the same as those of content conversion module 504 in the first embodiment. In addition, similarly, the configuration and the operation of license information interpretation module 1702 and decryption module 1703 are the same as those of license information interpretation module 506 and decryption module 508 respectively.

Meanwhile, the second embodiment is different from the first embodiment in that content display module 1402 uses its own license information interpretation module 1602 and decryption module 1603.

In addition, the second embodiment is again different from the first embodiment in that content conversion module 1404 uses its own license information interpretation module 1702 and decryption module 1703.

Here, an operation of content conversion module 1404 will be described with reference to the flowchart in FIG. 22. For the sake of brevity, portions common to the embodiment in FIG. 1 will be described in a simplified manner.

Figure 22:
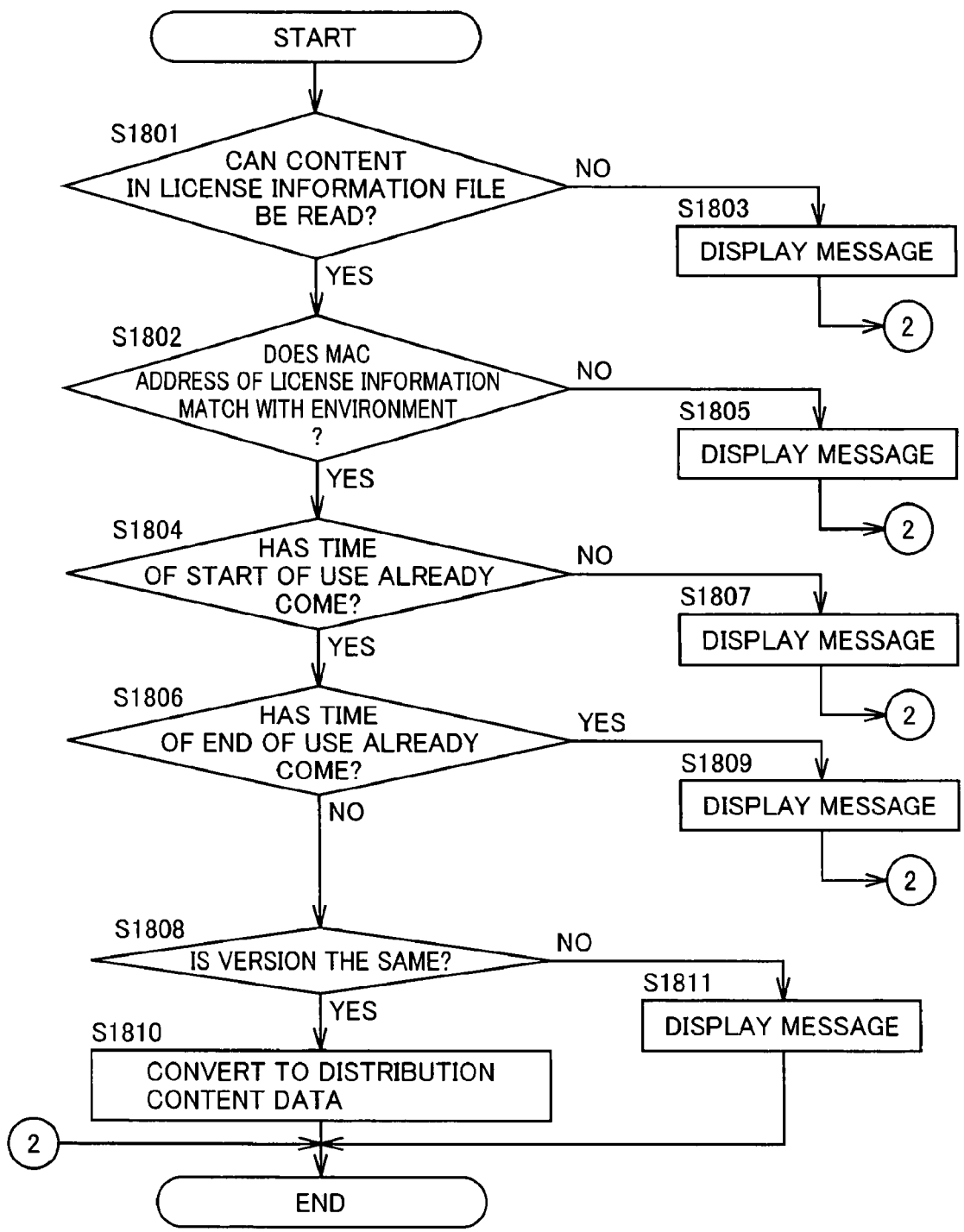
FIG. 22 is a flowchart illustrating an operation of the content conversion module in FIG. 18.

Referring to FIGS. 21 and 22, initially in S1801, main unit module 1701 checks whether or not the content can be read from license information file 1403. If reading is successful, the process proceeds to S1802, and otherwise, the process proceeds to S1803.

In S1802, license information interpretation module 1702 determines based on comparison whether any of use-permitted first MAC address 604, use-permitted second MAC address 605, . . . and use-permitted mth MAC address 606 matches with the MAC address of Ethernet (trademark) card 210. If the MAC addresses match, the process proceeds to S1804, and otherwise, the process proceeds to S1805.

In S1804, license information interpretation module 1702 determines whether or not time of start of use 602 has already come (whether the current time obtained from clock 209 is the same as time of start of use 602 or it indicates the time later than time of start of use 602). If time of start of use 602 has already come, the process proceeds to S1806, and otherwise, the process proceeds to S1807.

In S1806, license information interpretation module 1702 determines whether or not time of end of use 603 has already come (whether the current time obtained from clock 209 is the same as time of end of use 603 or it indicates the time later than time of end of use 603). If time of end of use 603 has not yet come, the process proceeds to S1808, and if time of end of use 603 has already come, the process proceeds to S1809.

According to the processing so far in the processing shown in FIG. 22, content conversion module 1404 performs collation between the license information included in license information file 1403 and the operation environment of content creation software 103.

In S1808, main unit module 1701 checks, based on comparison, which of use-permitted first version 607, use-permitted second version 608, . . . and use-permitted nth version 609 designated in license information file 1403 matches with the version of the descriptive format input as the parameter (such as an argument representing the version). If the versions match, the process proceeds to S1810, and otherwise, the process proceeds to S1811.

In S1810, main unit module 1701 converts the descriptive content data designated as the parameter to the distribution content data, and stores the resultant distribution content data in distribution content data storage area 1406.

The operation of main unit module 1701 in S1810 is exactly the same as that of content conversion module 504 in step S110 in the first embodiment. Then, after the processing in S1810, the operation of content conversion module 1404 ends.

The steps in the branch will be described as follows.

In S1803, main unit module 1701 displays a message that "reading from the license information file was unsuccessful," and the process ends.

In S1805, main unit module 1701 displays a message that "the use-permitted MAC address does not match with the MAC address of the computer," and the process ends.

In S1807, main unit module 1701 displays a message that "the time of start of use has not yet come," and the process ends.

In S1809, main unit module 1701 displays a message that "the time of end of use has come," and the process ends.

In S1811, main unit module 1701 outputs a message that "--- is not a use-permitted version," and the process ends ("---" should be the character string representing the version designated at the time of start).

An operation of content display module 1402 will now be described with reference to the flowchart in FIG. 23.

Figure 23:
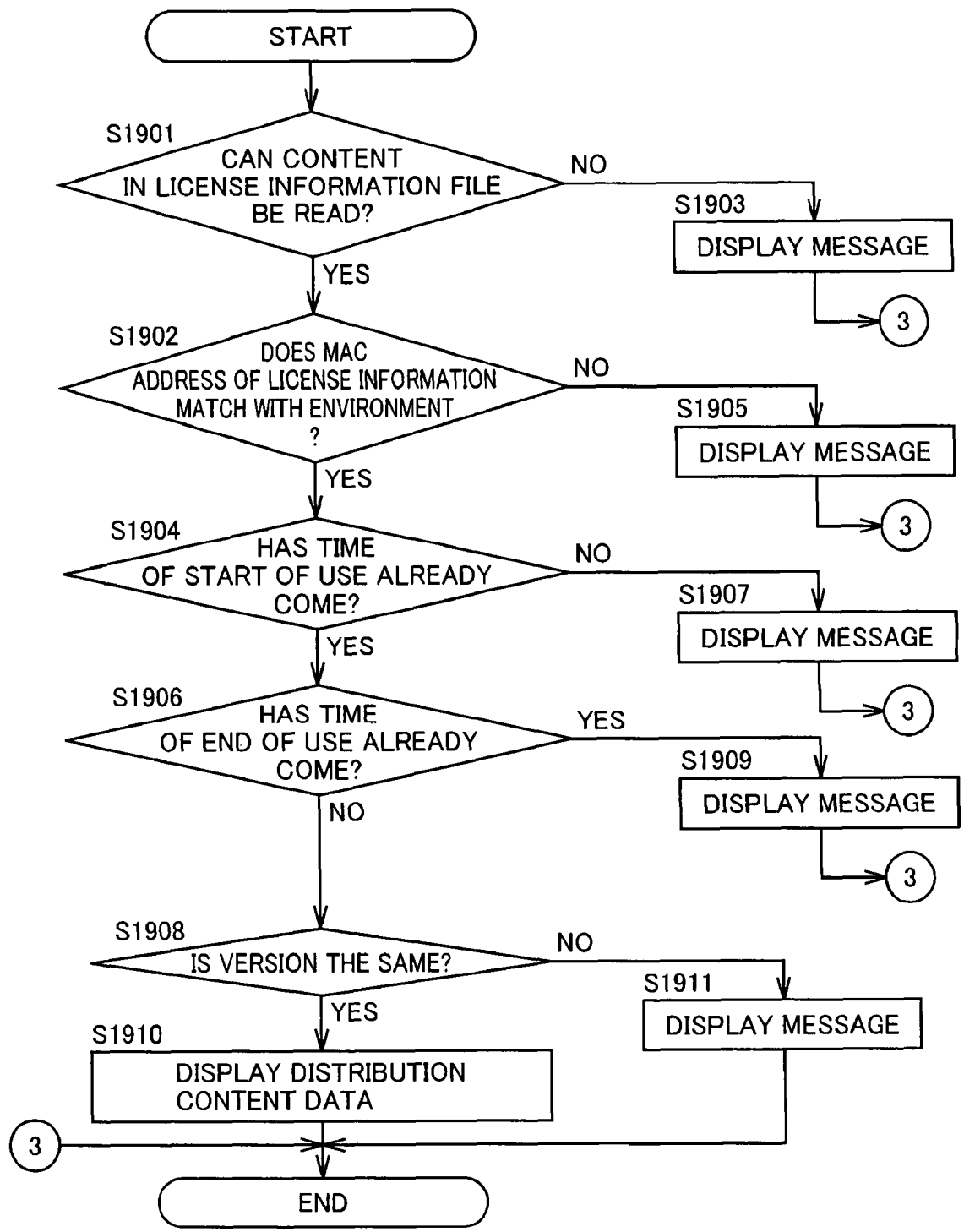
FIG. 23 is a flowchart illustrating an operation of the content display module in FIG. 18.

Referring to FIGS. 20 and 23, initially in S1901, main unit module 1601 checks whether or not license information file 1403 can be read. If reading is successful, the process proceeds to S1902, and otherwise, the process proceeds to S1903.

In S1902, license information interpretation module 1602 determines based on comparison whether any of use-permitted first MAC address 604, use-permitted second MAC address 605, . . . and use-permitted mth MAC address 606 matches with the MAC address of Ethernet (trademark) card 210. If the MAC addresses match, the process proceeds to S1904, and otherwise, the process proceeds to S1905.

In S1904, license information interpretation module 1602 determines whether or not time of start of use 602 has already come (whether the current time obtained from clock 209 is the same as time of start of use 602 or it indicates the time later than time of start of use 602). If time of start of use 602 has already come, the process proceeds to S1906, and otherwise, the process proceeds to S1907.

In S1906, license information interpretation module 1702 determines whether or not time of end of use 603 has already come (whether the current time obtained from clock 209 is the same as time of end of use 603 or it indicates the time later than time of end of use 603). If time of end of use 603 has not yet come, the process proceeds to S1908, and if time of end of use 603 has already come, the process proceeds to S1909.

According to the processing so far in the processing shown in FIG. 23, content conversion module 1404 performs collation between the license information included in license information file 1403 and the operation environment of content creation software 103.

In S1908, main unit module 1601 checks based on comparison which of use-permitted first version 607, use-permitted second version 608, . . . and use-permitted nth version 609 designated in license information file 1403 matches with the version of the distribution content data read from distribution content data storage area 1406. If the versions match, the process proceeds to S1910, and otherwise, the process proceeds to S1911.

In S1910, main unit module 1601 displays the distribution content data on display 207. Thus, the operation of content display module 1402 ends.

Display as shown in FIG. 15 is assumed as the display in S1910, as in the first embodiment. Here, display of user identification information 601 simultaneous with display of the distribution content data characterizes the processing in the present embodiment.

For example, user identification information 601 is displayed in a message that "this content viewer is licensed to ---." Such information does not have to be user identification information 601 itself, but such information as sufficiently allowing user identification may be employed. Moreover, display of such information may not be simultaneous with display of the distribution content data, and may be performed at timing around the timing of display of the distribution content data, or as a result of a specific operation.

The steps in the branch will be described as follows.

In S1903, main unit module 1601 displays a message that "reading from the license information file was unsuccessful," and the process ends.

In S1905, main unit module 1601 displays a message that "the use-permitted MAC address does not match with the MAC address of the computer," and the process ends.

In S1907, main unit module 1601 displays a message that "the time of start of use has not yet come," and the process ends.

In S1909, main unit module 1601 displays a message that "the time of end of use has come," and the process ends.

In S1911, main unit module 1601 outputs a message that "AAA is not a use-permitted version," and the process ends ("AAA" should be the character string representing the version designated at the time of start).

A primary effect of the content data creation device according to the second embodiment described above is that use of each component in content creation software 103 in another application by a malicious user can be deterred by the feature that each module modifies the operation based on the result of comparison between the content in license information file 1403 and the operation environment.

For example, even if an attempt to take out solely content display module 1402 or content conversion module 1404 (for example, by copying the module to another computer) for use for another purpose is made, license information file 1403 for content creation software 103 is required, and use in a computer in which license information file 1403 is different or absent is disabled.

In addition, user identification information 601 in license information file 1403 is written in the distribution content data through the intermediate content data. Accordingly, even if a malicious user could use content conversion module 1404 alone, user identification information 601 of content creation software 103 remains in the distribution content data. Therefore, use of solely content conversion module 1404 for another purpose by a malicious user is further deterred.

As to content display module 1402 of the present embodiment, as the information on the license file (user identification information) is displayed during display of the distribution content data, use of content conversion module 1404 alone by another user intended by a malicious user can reliably be deterred. In addition, in some cases, the purpose of the software is displayed at appropriate timing, through a message that "this content viewer is licensed to 'PPP' (person's name or the like) as a part of the content creation software," thereby further enhancing deterrence.

Moreover, the condition of the operation environment of GUI manager module 1401, content display module 1402 and content conversion module 1404 described in license information file 1403 may include whether or not all of these modules are present in an identical system. Such an operation is again effective for preventing use of each component for an originally unintended purpose (on the contrary, absence of specific software or module in the system can be employed as the condition).

In the second embodiment described above, it can be said that license information file 1403 describes a range of data of which input is permitted, of data display module 1402 or content conversion module 1404, by using use-permitted first version 607, use-permitted second version 608, . . . and use-permitted nth version 609.

Figure 24:
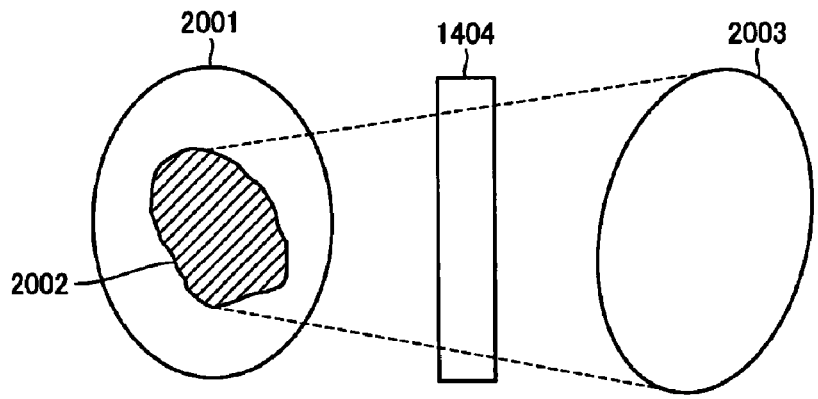
FIG. 24 is a conceptual diagram for illustrating an effect of the present invention.

As shown in the conceptual diagram in FIG. 24, in an entire input space 2001 representing the entire data that can be input by using the software, an input-permitted space 2002 representing a range of data of which input is permitted is determined by license information file 1403.

Figure 25:
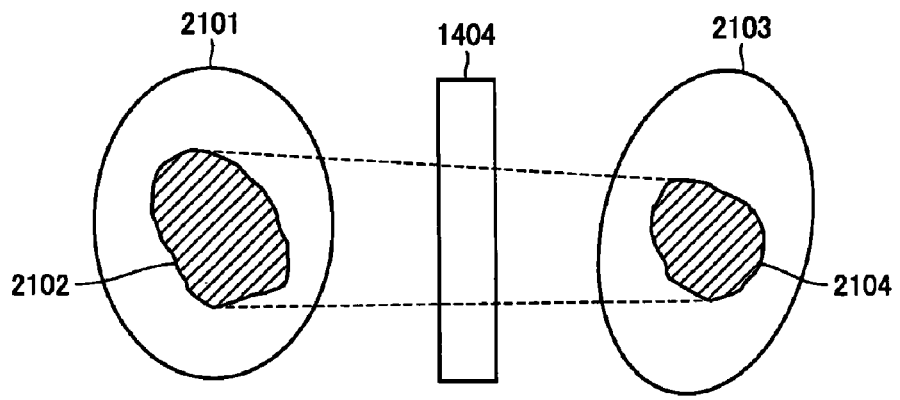
FIG. 25 is a conceptual diagram for illustrating an effect of the present invention.

In addition, as shown in FIG. 25, as a result of determination of an input-permitted space 2102, it can also be considered that a range of data of which output is permitted has simultaneously been determined by the operation of the software. It is noted that FIGS. 24 and 25 illustrate an entire output space 2104 representing the entire data that can be output by using the software.

Figure 26:
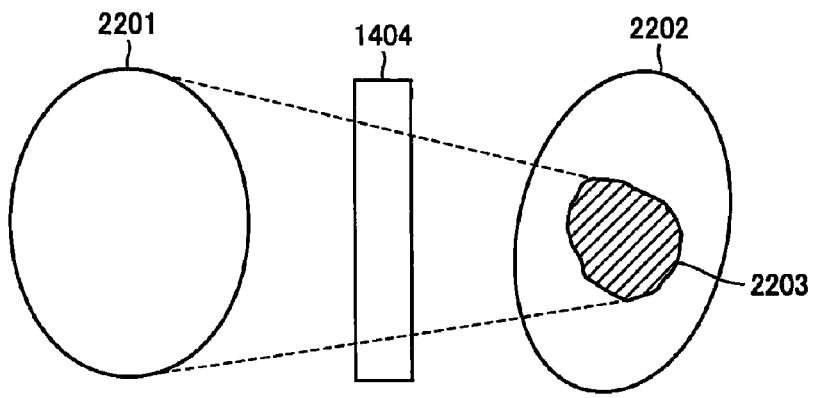
FIG. 26 is a conceptual diagram for illustrating an effect of the present invention.

Similarly, as shown in the conceptual diagram in FIG. 26, it is also possible to explicitly determine an output-permitted space representing a range of data of which output is permitted, by using license information file 1403. Such an example will briefly be described.

For example, assuming that use-permitted first version 607, use-permitted second version 608, . . . and use-permitted nth version 609 of license information file 1403 describe the version of the distribution content data, values thereof and meaning of each value are assumed as follows.

As to version1, image data included in the descriptive content data is all converted to PNG image data files, thereby creating the distribution content data.

As to version2, JPEG data among images included in the descriptive content data is used as it is for the distribution content data, whereas other image data is all converted to PNG image data files, thereby creating the distribution content data.

As to version3, the images included in the descriptive content data are all used as they are regardless of the type thereof, thereby creating the distribution content data.

Under such an assumption, license information file 1403 determines an output-permitted space of content conversion module 1404.

According to the present invention, the range of data of which input is permitted and the range of data of which output is permitted can be described as the license information, which is effective in the software having commercial significance in the range of data of which input is permitted and the range of data of which output is permitted, such as the content creation software in particular. For example, the user who desires input or output in a wider range can be charged by using such a method as issuance of a new license information file for pay.

The term version1, version2 and version3 used herein is understood as a name of a data category representing a subset of the entire input space or the entire output space, and it is considered that such a data category is described in license information file 1403. Naturally, description of the data category is not the only method of describing the range of data, however, it is a simple method.

In the examples described so far, explicitly, solely any one of the input-permitted space or the output-permitted space has explicitly been designated, however, the input-permitted space and the output-permitted space can naturally simultaneously be designated in the license information file. For example, versions of two types to be described in the license information file, one corresponding to input and one corresponding to output, can be designated. As the operation in the case where the version for input is described in the license information file as well as the configuration and the operation in the case where the version for output is described therein have already been described, the configuration and the operation in the case where both of the above versions are simultaneously described will not be repeated here.

In the example of the category of data of which output is permitted, version3 has upward compatibility over version2 and version2 has upward compatibility over version1.

Such upward compatibility between categories is not essential. If each category has upward compatibility in actually determining a profile defining capability of a conversion device or a display device, however, the capability of the display device can be described by using one parameter of a version, which serves to simplify the system. In addition, according to such a scheme, comparison of display capability levels of the conversion device or the display device is also advantageously easy for a user.

In the second embodiment, content display module 1402, content conversion module 1404 and GUI manager module 1401 of content creation software 103 are controlled based on license information file 1403, however, this is by way of example and such an effect is obtained also with software having a different configuration or purpose. What is important is that some components share license information while each having a module for interpreting the same, so that use of the component departed from its original purpose is difficult even if the component alone is taken out.

In addition, in the first and second embodiments, the license information has been represented in a form of a file, as a license information file. This is by way of example as a typical method of storing information in a computer in present days, and actually, another implementation such as data on ROM 202 is still within the scope of the present invention.

Moreover, in S107, it is possible that a version of which use is not permitted may also be displayed together. In such a case, as shown in FIGS. 27 and 28, preferably, a version of which use is permitted and a version of which use is not permitted are displayed in different manners (display color or drawing strikeout).

Figure 27:
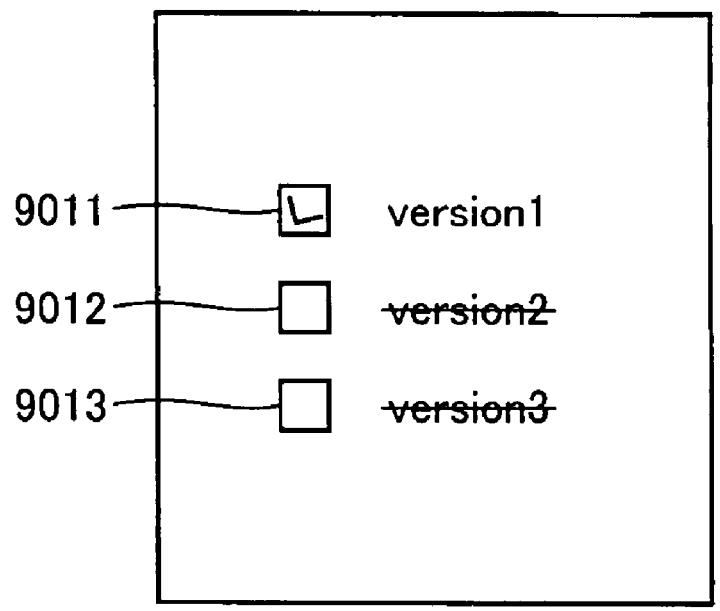
FIG. 27 illustrates yet another example of a display manner on the display in accordance with processing in the flowchart in FIG. 10.
Figure 28:
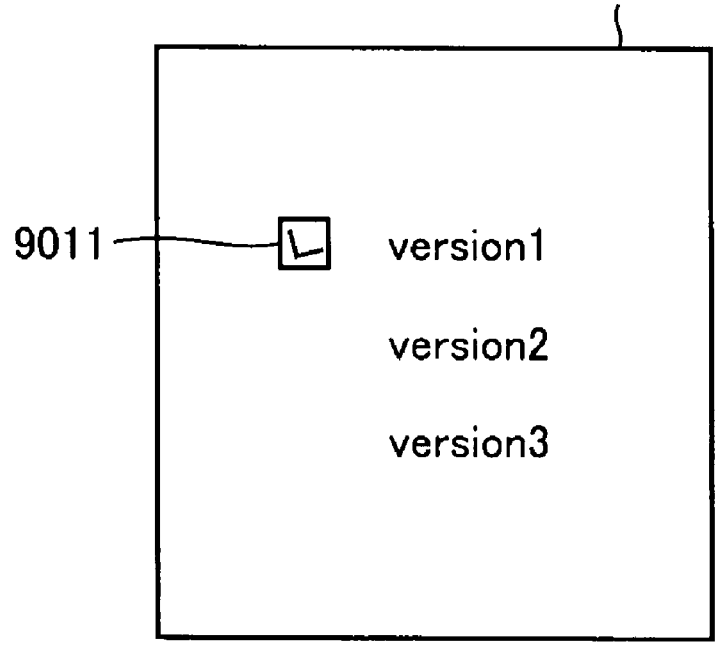
FIG. 28 illustrates another example of a display manner on the display in accordance with processing in the flowchart in FIG. 10.

Specifically, in a screen 9030 in FIG. 27, "version2" and "version3" of which use is not permitted are displayed with strikeouts, unlike "version2" of which use is permitted. In addition, in a screen 9040 in FIG. 28, "version2" and "version3" of which use is not permitted are displayed without a radio button, unlike "version1" of which use is permitted.

In other words, a version of which use is not permitted may not be displayed, or a version of which use is not permitted may be displayed in a manner different from the version of which use is permitted, for example, by displaying the version of which use is not permitted in a pale color. Thus, an effect to urge additional contract for allowing use of the version of which use is not currently permitted can be obtained.

If the version of which use is not permitted is also displayed, GUI manager module 501 requires information on the version of which use is permitted, that can possibly be designated by license information file 508.

In addition, such a method is applicable not only to content creation software but also to software in which a range of data of which input is permitted and/or a range of data of which output is permitted can be described in a form of license information.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

According to the present invention, a range of content data to be output is controlled, based on the information on a use-permitted range that is described in the license information file in the content creation software.

The invention claimed is:

1. A content data creation device creating output data for reproduction in a reproduction device by converting input data which is content described by a user, comprising:
   license information storage storing license information including a range of data declarations describing data of which input or output is permitted;
   input data designator designating the input data to be converted; and
   converter creating the output data by performing conversion processing on the input data designated by said input data designator, to the extent permitted by said data declarations within said range included in said license information, wherein
   said license information describes the range of the data declarations for the data of which input or output is permitted by describing a category of data, which represents a subset of an entire input space representing entire range of the data declarations for the data of which input is permitted or an entire output space representing entire range of the data declarations for the data of which output is permitted.

2. The content data creation device according to claim 1, further comprising:
   permitted range designator designating a range of data declarations permitted for said conversion processing, within the range stored in said license information storage; and
   display for displaying a menu of choices of a range of data declarations for said input data or said output data, for allowing designation by said permitted range designator; wherein
   said display displays a menu of choices indicating a range of the data declarations for the input data or the output data not permitted by said license information, in a manner different from the menu of choices indicating the range of the data declarations for the input data or the output data permitted by said license information.

3. The content data creation device according to claim 1, further comprising:
   permitted range designator for designating a range of data declarations permitted for said conversion processing, within the range stored in said license information storage; and
   display for displaying a menu of choices of a range of said input data or said output data, for allowing designation by said permitted range designation means; wherein
   said display displays solely a menu of choices indicating a range of the data declarations for the input data or the output data permitted by said license information, as said menu of choices for allowing designation.

4. The content data creation device according to claim 1, consisting of at least two modules and further comprising:
   collator collating an operation environment and said license information for each said module; and
   controller controlling an operation of each module based on a result of collation by said collator.

5. The content data creation device according to claim 1, wherein
   said license information includes user identification information for identifying the user, and
   said converter creates said output data including said user identification information.

6. The content data creation device according to claim 5, wherein
   said user identification information is stored in said identification information storage in an encrypted state.

7. The content data creation device according to claim 6, further comprising display displaying said output data; wherein
   said display displays said user identification information in addition to said output data.

8. The content data creation device according to claim 5, further comprising display for displaying said output data; wherein
   said display displays said user identification information in addition to said output data.

9. The content data creation device according to claim 1, wherein
   said category of data refers to a version of the input data or the output data.

10. A content data creation method for creating output data for use in a reproduction device by converting input data which is content described by a user in a content data creation device including a storage device, comprising the steps of:
    storing license information including a range of data declarations describing data of which input or output is permitted in the storage device of said content data creation device;
    designating the input data to be converted; and
    performing conversion processing, by said content data creation device on said designated input data in accordance with said range of data declarations included in said license information, wherein
    said license information describes the range of the data declarations for the data of which input or output is permitted by describing a category of data, which represents a subset of an entire input space representing entire range of the data declarations for the data of which input is permitted or an entire output space representing entire range of the data declarations for the data of which output is permitted.

11. A non-transitory computer readable memory medium storing a content data creation program for creating output data for use in a reproduction device by converting input data which is content described by a user, which when executed causes a computer to perform the steps of:
    storing license information including a range of data declarations describing data of which input or output is permitted;
    designating the input data to be converted; and
    creating the output data by performing conversion processing on said designated input data in accordance with said range of data declarations included in said license information, wherein
    said license information describes the range of the data declarations for the data of which input or output is permitted by describing a category of data, which represents a subset of an entire input space representing entire range of the data declarations for the data of which input is permitted or an entire output space representing entire range of the data declarations for the data of which output is permitted.

12. A content data display device, comprising:
license information storage storing encrypted license information including a range of data declarations describing data of which input or output is permitted;
content data storage storing content data encrypted with a method commonly used for said license information;
decryption section decrypting said license information and said content data; and
display for displaying the content data decrypted by said decryption section, wherein
said license information describes the range of the data declarations for the data of which input or output is permitted by describing a category of data, which represents a subset of an entire input space representing entire range of the data declarations for the data of which input is permitted or an entire output space representing entire range of the data declarations for the data of which output is permitted.

* * * * *